United States Patent
Chambers et al.

(10) Patent No.: US 10,133,592 B2
(45) Date of Patent: *Nov. 20, 2018

(54) PARALLEL PROCESSING OF DATA

(71) Applicant: Google LLC, Mountain View, CA (US)

(72) Inventors: Craig D. Chambers, Seattle, WA (US); Ashish Raniwala, Bellevue, WA (US); Frances J. Perry, Seattle, WA (US); Stephen R. Adams, Seattle, WA (US); Robert R. Henry, Seattle, WA (US); Robert Bradshaw, Seattle, WA (US); Nathan Weizenbaum, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,044

(22) Filed: Apr. 10, 2017

(65) Prior Publication Data
US 2017/0242715 A1   Aug. 24, 2017

Related U.S. Application Data

(60) Continuation of application No. 14/622,556, filed on Feb. 13, 2015, now Pat. No. 9,626,202, which is a
(Continued)

(51) Int. Cl.
*G06F 9/44*  (2018.01)
*G06F 9/45*  (2006.01)
(Continued)

(52) U.S. Cl.
CPC .......... *G06F 9/45504* (2013.01); *G06F 8/314* (2013.01); *G06F 8/34* (2013.01);
(Continued)

(58) Field of Classification Search
CPC .......... G06F 9/45504; G06F 17/30445; G06F 17/30471; G06F 21/6218; G06F 21/577;
(Continued)

(56) References Cited

U.S. PATENT DOCUMENTS 6,128,642 A * 10/2000 Doraswamy ............ G06F 9/505
709/201
7,164,422 B1   1/2007 Wholey, III et al.
(Continued)

FOREIGN PATENT DOCUMENTS

CN   101443733 A   5/2009

OTHER PUBLICATIONS

N. Johnson, Background work with the deferred library, Oct. 2009, 12 pages.*

(Continued)

*Primary Examiner* — Thuy Dao
(74) *Attorney, Agent, or Firm* — Fish & Richardson P.C.

(57) ABSTRACT

A data parallel pipeline may specify multiple parallel data objects that contain multiple elements and multiple parallel operations that operate on the parallel data objects. Based on the data parallel pipeline, a dataflow graph of deferred parallel data objects and deferred parallel operations corresponding to the data parallel pipeline may be generated and one or more graph transformations may be applied to the dataflow graph to generate a revised dataflow graph that includes one or more of the deferred parallel data objects and deferred, combined parallel data operations. The deferred, combined parallel operations may be executed to produce materialized parallel data objects corresponding to the deferred parallel data objects.

17 Claims, 13 Drawing Sheets

Related U.S. Application Data continuation of application No. 14/033,145, filed on Sep. 20, 2013, now Pat. No. 8,959,499, which is a division of application No. 12/794,348, filed on Jun. 4, 2010, now Pat. No. 8,555,265.

(60) Provisional application No. 61/331,148, filed on May 4, 2010.

(51) Int. Cl.
| | |
|---|---|
| *G06F 17/30* | (2006.01) |
| *G06F 9/455* | (2018.01) |
| *G06F 21/62* | (2013.01) |
| *G06F 9/38* | (2018.01) |
| *G06F 8/41* | (2018.01) |
| *G06F 9/48* | (2006.01) |
| *G06F 8/30* | (2018.01) |
| *G06F 8/34* | (2018.01) |
| *G06F 9/445* | (2018.01) |
| *G06F 21/57* | (2013.01) |
| *G06F 9/30* | (2018.01) |
| *G06F 9/448* | (2018.01) |

(52) U.S. Cl.
CPC .............. *G06F 8/433* (2013.01); *G06F 9/38* (2013.01); *G06F 9/3851* (2013.01); *G06F 9/3885* (2013.01); *G06F 9/44* (2013.01); *G06F 9/445* (2013.01); *G06F 9/45533* (2013.01); *G06F 9/4843* (2013.01); *G06F 21/577* (2013.01); *G06F 21/62* (2013.01); *G06F 21/6218* (2013.01); *G06F 9/30* (2013.01); *G06F 9/4494* (2018.02); *G06F 17/30445* (2013.01); *G06F 17/30471* (2013.01); *G06F 2221/034* (2013.01)

(58) Field of Classification Search
CPC ........ G06F 9/3851; G06F 9/3885; G06F 8/34; G06F 8/433; G06F 8/314
See application file for complete search history.

(56) References Cited

U.S. PATENT DOCUMENTS

| | | | |
|---|---|---|---|
| 7,650,331 B1 | 1/2010 | Dean et al. | |
| 7,716,630 B2 | 5/2010 | Wholey et al. | |
| 7,844,959 B2 | 11/2010 | Isard | |
| 7,921,416 B2 | 4/2011 | Fontoura et al. | |
| 8,209,664 B2 | 6/2012 | Yu et al. | |
| 8,239,847 B2 | 8/2012 | Yu et al. | |
| 8,266,412 B2* | 9/2012 | Glew | G06F 9/3012 712/220 |
| 8,296,743 B2 | 10/2012 | Linderman et al. | |
| 8,429,630 B2 | 4/2013 | Schumacher et al. | |
| 8,429,631 B2 | 4/2013 | Nickolov et al. | |
| 8,478,967 B2* | 7/2013 | Bordelon | G06F 8/433 712/11 |
| 8,528,000 B2* | 9/2013 | Schumacher | G06F 8/10 703/14 |
| 9,454,571 B2 | 9/2016 | Grosse et al. | |
| 9,477,502 B2 | 10/2016 | Chambers et al. | |
| 9,733,914 B2* | 8/2017 | Yi | G06F 8/4452 |
| 2005/0097561 A1 | 5/2005 | Schumacher et al. | |
| 2007/0038659 A1 | 2/2007 | Datar | |
| 2007/0083730 A1 | 4/2007 | Vorbach et al. | |
| 2008/0005794 A1 | 1/2008 | Inoue et al. | |
| 2008/0098375 A1 | 4/2008 | Isard | |
| 2008/0209044 A1* | 8/2008 | Forrester | G06F 9/505 709/226 |
| 2008/0250227 A1 | 10/2008 | Linderman et al. | |
| 2009/0119541 A1 | 5/2009 | Inoue et al. | |
| 2009/0217020 A1* | 8/2009 | Yourst | G06F 9/383 712/245 |
| 2009/0225082 A1 | 9/2009 | Hargrove et al. | |
| 2009/0282477 A1 | 11/2009 | Chen et al. | |
| 2010/0005080 A1 | 1/2010 | Pike et al. | |
| 2010/0017761 A1 | 1/2010 | Higuchi et al. | |
| 2010/0083185 A1 | 4/2010 | Sakai | |
| 2010/0162230 A1 | 6/2010 | Chen | |
| 2010/0175049 A1 | 7/2010 | Ramsey et al. | |
| 2010/0241828 A1* | 9/2010 | Yu | G06F 8/456 712/30 |
| 2010/0281078 A1 | 11/2010 | Wang et al. | |
| 2010/0318963 A1 | 12/2010 | Kajiya | |

OTHER PUBLICATIONS

Kalkusch et al., Extending the scene graph with a dataflow visualization system, 9 pages. (Year: 2006).*

Hsu et al., Efficient simulation of critical synchronous dataflow graphs, 28 pages. (Year: 2007).*

Isard et al. Distributed Data-Parallel Computing Using a High-Level [online]. SIGMOD'09, Jun. 29-Jul. 2. 2009. Providence, Rhode Island, USA. [retrieved on Jul. 25, 2011] Retrieved from the Internet <URL: http://research.microsoft.com/pubs/102137/sigmod09.pd (p. 1. col. 1, p. 7, col. 1, para. 3-4, col. 2, p. 8. col. 2, para 2. p. 10-11. Fig. 10).

Roy et al. "Airavat: Security and Privacy for MapReduce." [online] In Proc. of 7th USENIX Symposium on Networked Systems Design and Implementation (NSDI). San Jose. CA. Apr. 2010 [retrieved on Jul. 24, 2011] Retrieved from the Internet<URL:http://www.cs.utexas.edu/~shmat/shmat_nsdi10.pdf> p. 2 and 8.

Gates et al. "Building a HighLevel Dataflow System on top of MapReduce: The Pig Experience." [online] VLDB ?09, Aug. 24-28, 2009. [retrieved on Jul. 25, 2011] Retrieved from the Internet <URL:http://cloud.pubs.dbs.uni-leipzig.de/sites/cloud.pubs.dbs.uni-leipzig.de/files/Reed2009BuildingHighLevelDataowSystemontopofMapReduce.pdf.

Liu et al. "Automatic Optimisation of MapReduce Designs by Geometric Programming" [online] 2009. [retrieved on Jul. 23, 2011] Retrieved from the Internet <URL:http://cas.ee.ic.ac.uklpeople/gac1/pubs/QiangFPT09.pdf>.

Citation containing publication date for: Roy el a!. "Airavat: Security and Privacy for MapReduce." [online] In Proc. of 7th USENIX Symposium on Networked Systems Design and Implementation (NSDI). San Jose. CA. Apr. 2010 [retrieved on Jul. 24, 2011] Retrieved from the Internet<URL: http://www.cs.utexas.edul-shmat/shmat_nsdi10.pdf>.

Written Opinion of the International Searching Authority and International Search Report for PCT/US2011/035159 dated Aug. 9, 2011.

Pike et al., Interpreting the data: Parallel analysis with Sawzall. Scientific Programming, 13(4):277-298, 2005.

Pig. http://hadoop.apache.org/pig. as of Nov. 2, 2009, retrieved from the Internet,URL:http://web.archive.org/web/20091102135550/http://hadoop.apache.org/pig/[Mar. 27, 2012].

Olsten et al., Pig Latin: A not-so-foreign language for data processing. In SIGMOD Conference, 2008.

Dean, Experiences with MapReduce an abstraction for large-scale computation. In PACT, 2006.

Chaiken et al., SCOPE: Easy and efficient parallel processing of massive data sets. PVLDB, 1(2), 2008.

Yu et al., DryadLINQ: A system for general—purpose distributed data-parallel computing using a high-level language. In OSDI, 2008.

Dean and Ghemawat. MapReduce: Simplified data processing on large clusters. Communication of the ACM, 51. No. 1, 2008.

Ghemawat et al. The Google file system. In SOSP, 2003.

C. Lasser and S.M. Omohundro. The essential Star-lisp manual, Technical Report 86.15, Thinking Machines, Inc. Complete citation: Lasser, Cliff, et al., "The Essential *Lisp Manual, Release 1, Revision 3," Thinking Machines Technical Report 86.15, Thinking Machines Corporation, Apr. 1986, 59 pages.

R.S. Nikhail and Arvind. Implicit Parallel Programming in pH. Academic Press, 2001.

(56) References Cited

OTHER PUBLICATIONS

E.Meijer et al., LINQ: reconciling objects. Complete citation: Meijer, Erik, et al., "LINQ: Reconciling objects, relations and XML in the .NET framework," SIGMOD 2006, Jun. 27-29, 2006, 1 page.
Isard et al., Dryad: Distributed data-parallel programs from sequential building blocks. In EuroSys, 2007.
Larus, C. A large-grain, object-oriented, data-parallel programming language. UW Technical Report #1126, In LCPC, 1992.
Chambers, C., Raniwala, A., Perry, F., Adams, S., Henry, R.R., Bradshaw, R., and Weizenbaum, N. FlumeJava: easy, efficient data-parallel pipelines. In Proceedings of PLDI. 2010, 363-375.
Cascading. http://www.cascading.org as of Nov. 9, 2009, retrieved from the Internet, URL:http://web.archive.org/web/20091115135536/http://www.cascading.org/[Mar. 27, 2012 11:30:56 AM].
J.R. Rose and G.L. Steele Jr., C. An Extended C language. In C++ Workshop, 1987.
Hadoop. http://hadoop.apache.org. as of Nov. 24, 2009, retrieved from the Internet, URL: http://web.archive.org/web/20091124215304/http://hadoop.apache.org/[Mar. 27, 2012 11:48:26 AM].
R.H. Halstead Jr. New ideas in parallel Lip: Language design implementation, and programming tools. In Workshop on Parallel Lisp, 1989.
Chang et al., Bigtable: A distributed storage system for structured data. In OSDI, 2006.
H.-c, Yang, A. et al., Map-reduce-merge: simplified relational data processing on large clusters. In SIGMOD Conference, 2007.
Dean and Ghemawat. MapReduce. Simplified data processing on large clusters. In OSDI, 2004.
Chen, Qiming et al., "Efficiently Support MapReduce-like Computation Models Inside Parallel DBMS," IDEAS 2009, Sep. 16-18, 2009, 11 pages.
Hu, Zhenjiang, "Calculational Parallel Programming (Parallel Programming with Homomorphism and MapReduce)," National Institute of Informatics, Sep. 27, 2010, 1 page.
Johnson, "Background work with the deferred library," Google Cloud Platform, Oct. 2009, 11 pages.
Thomas et al., Utilization of map-reduce for parallelization of resource scheduling using MPI: PRS, Feb. 2011, 6 pages.
Ramesh et al., Project Hoover: auto-scaling streaming map-reduce applications, Sep. 2012, 6 pages.
Office Action issued in Chinese Application No. 201510772809.0, dated Mar. 15, 2018, 15 pages (with English Translation).
Notice of Allowance issued in Korean Application No. 10-2017-7020753, dated Mar. 29, 2018, 4 pages (with English Translation).

* cited by examiner

PARALLEL PROCESSING OF DATA

CLAIM OF PRIORITY

This application is a continuation of and claims the benefit of priority to U.S. patent application Ser. No. 14/622,556, filed on Feb. 13, 2015, which is a Continuation of application Ser. No. 14/033,145, filed on Sep. 20, 2013, which is a Divisional of U.S. patent application Ser. No. 12/794,348, filed on Jun. 4, 2010, now Issued U.S. Pat. No. 8,555,265, which claims the benefit of priority to U.S. Provisional Patent Application Ser. No. 61/331,148, filed on May 4, 2010, the entire contents of which are hereby incorporated by reference.

TECHNICAL FIELD

This disclosure relates to parallel processing of data.

BACKGROUND

Large-scale data processing may include parallel processing, which generally involves performing some operation over each element of a large data set. The various operations may be chained together in a data-parallel pipeline to create an efficient mechanism for processing a data set.

SUMMARY

In one aspect, a system includes one or more processing devices and one or more storage devices. The storage devices store instructions that, when executed by the one or more processing devices, implement an application, an evaluator, an optimizer, and an executor. The application includes a data parallel pipeline. The data parallel pipeline specifies multiple parallel data objects that contain multiple elements and multiple parallel operations that operate on the parallel data objects. The evaluator is configured, based on the data parallel pipeline, to generate a dataflow graph of deferred parallel data objects and deferred parallel operations corresponding to the data parallel pipeline.

Deferred parallel data objects, for example, can be data structures that include a pointer to the parallel data operation that operates on the parallel data objects, rather than the elements stored in the parallel data object. Deferred parallel operations, for example, can be data structures that include a pointer to a parallel data object that is an input to the deferred parallel operation, a pointer to a deferred parallel object that is an output of the deferred parallel operation, and a function to be (but has not yet been) performed on the input object.

The optimizer is configured to apply one or more graph transformations to the dataflow graph to generate a revised dataflow graph that includes one or more of the deferred parallel data objects and deferred, combined parallel data operations. The executor configured to execute the deferred, combined parallel operations to produce materialized parallel data objects corresponding to the deferred parallel data objects. Materialized parallel data objects, for example, can be data structures that include the data or elements of the parallel data object.

Implementations of this aspect may include one or more of the following features. For example, the deferred, combined parallel data operations may include at least one generalized mapreduce operation. The generalized mapreduce operation may include multiple, parallel map operations and multiple, parallel reduce operations and be translatable to a single mapreduce operation that includes a single map function to implement the multiple, parallel map operations and a single reduce function to implement the multiple, parallel reduce operations. To execute the generalized mapreduce operation, the executor may be configured to translate the combined mapreduce operation to the single mapreduce operation and execute the single mapreduce operation. To execute the single mapreduce operation, the executor may be configured to determine whether to execute the single mapreduce operation as a local, sequential operation or a remote, parallel operation. To translate the generalized mapreduce operation to the single mapreduce operation, the executor may be configured to generate a map function that includes the multiple map operations and a reducer function that includes the multiple reducer operations.

The multiple parallel data objects may be first class objects of a host programming language.

The pipeline further may include a single data object that contains a single element and the dataflow graph includes a corresponding deferred single data object. At least one of the multiple parallel operations in the pipeline may operate on the single data object and one of the multiple parallel data objects and the dataflow graph may include a corresponding deferred parallel operation that operates on a deferred single data object and a deferred parallel data object.

The executor may be configured to cache one or more results of the execution of the deferred, combined parallel operations for use in a future execution of the data parallel pipeline.

In another aspect, a method includes executing an application that includes a data parallel pipeline. The data parallel pipeline specifies multiple parallel data objects that contain multiple elements and multiple parallel operations that operate on the parallel data objects. The method further includes generating, based on the data parallel pipeline, a dataflow graph of deferred parallel data objects and deferred parallel operations corresponding to the data parallel pipeline. Deferred parallel data objects, for example, can be data structures that include a pointer to the parallel data operation that operates on the parallel data objects, rather than the elements stored in the parallel data object. Deferred parallel operations, for example, can be data structures that include a pointer to a parallel data object that is an input to the deferred parallel operation, a pointer to a deferred parallel object that is an output of the deferred parallel operation, and a function to be (but has not yet been) performed on the input object.

The method also includes applying one or more graph transformations to the dataflow graph to generate a revised dataflow graph that includes one or more of the deferred parallel data objects and deferred, combined parallel data operations. In addition, the method includes executing the deferred, combined parallel operations to produce materialized parallel data objects corresponding to the deferred parallel data objects. Materialized parallel data objects, for example, can be data structures that include the data or elements of the parallel data object.

Implementations of this aspect may include one or more of the following features. For example, the deferred, combined parallel data operations may include at least one generalized mapreduce operation. The generalized mapreduce operation may include multiple, parallel map operations and multiple, parallel reduce operations and be translatable to a single mapreduce operation that includes a single map function to implement the multiple, parallel map operations and a single reduce function to implement the multiple, parallel reduce operations. Executing the generalized mapreduce operation may include translating the combined mapreduce operation to the single mapreduce operation and executing the single mapreduce operation. Executing the single mapreduce operation may include determining whether to execute the single mapreduce operation as a local, sequential operation or a remote, parallel operation. Translating the generalized mapreduce operation to the single mapreduce operation may include generating a map function that includes the multiple map operations and a reducer function that includes the multiple reducer operations.

The multiple parallel data objects may be first class objects of a host programming language.

The pipeline further may include a single data object that contains a single element and the dataflow graph includes a corresponding deferred single data object. At least one of the multiple parallel operations in the pipeline may operate on the single data object and one of the multiple parallel data objects and the dataflow graph may include a corresponding deferred parallel operation that operates on a deferred single data object and a deferred parallel data object.

The method may include caching one or more results of the execution of the deferred, combined parallel operations for use in a future execution of the data parallel pipeline.

In another aspect, a system includes one or more processing devices and one or more storage devices. The storage devices store instructions that, when executed by the one or more processing devices, implement an executor. The executor is configured to access a dataflow graph that includes deferred parallel data objects and deferred, combined parallel data operations. Deferred parallel data objects, for example, can be data structures that include a pointer to the parallel data operation that operates on the parallel data objects, rather than the elements stored in the parallel data object. Deferred parallel operations, for example, can be data structures that include a pointer to a parallel data object that is an input to the deferred parallel operation, a pointer to a deferred parallel object that is an output of the deferred parallel operation, and a function to be (but has not yet been) performed on the input object.

The executor is configured to execute the deferred, combined parallel operations to produce materialized parallel data objects corresponding to the deferred parallel data objects. Materialized parallel data objects, for example, can be data structures that include the data or elements of the parallel data object. For at least one of the deferred, combined parallel operations, the executor is configured to execute the at least one deferred, combined parallel operation by determining an estimated size of data associated with the at least one deferred, combined parallel operation; determining whether the estimated size exceeds a threshold size; if the estimated size is below a threshold size, execute the at least one deferred, combined parallel operation as a local, sequential operation; and if the estimated size exceeds a threshold size, execute the at least one deferred, combined parallel operation as remote, parallel operation.

Implementations of this aspect may include one or more of the following features. For example, the data associated with the at least one deferred, combined parallel operation may include one or more of input data for the at least one deferred, combined parallel operation, intermediary data produced by the at least one deferred, combined parallel operation, or output data produced by the at least one deferred, combined parallel operation. The at least one deferred, combined parallel data operation may be a generalized mapreduce operation. The generalized mapreduce operation may include multiple, parallel map operations and multiple, parallel reduce operations and be translatable to a single mapreduce operation that includes a single map function to implement the multiple, parallel map operations and a single reduce function to implement the multiple, parallel reduce operations. To execute the generalized mapreduce operation, the executor may be configured to translate the combined mapreduce operation to the single mapreduce operation and execute the single mapreduce operation. To execute the single mapreduce operation as a remote, parallel operation, the executor may be configured to cause the single mapreduce operation to be copied and executed on multiple, different processing modules in a datacenter. To translate the generalized mapreduce operation to the single mapreduce operation, the executor may be configured to generate a map function that includes the multiple map operations and a reducer function that includes the multiple reducer operations. To determine the estimated size, the executor may be configured to access annotations in the dataflow graph that reflect an estimate of the size of the data associated with the at least one deferred, combined parallel operation.

In another aspect, a method includes accessing a dataflow graph that includes deferred parallel data objects and deferred, combined parallel data operations. Deferred parallel data objects, for example, can be data structures that include a pointer to the parallel data operation that operates on the parallel data objects, rather than the elements stored in the parallel data object. Deferred parallel operations, for example, can be data structures that include a pointer to a parallel data object that is an input to the deferred parallel operation, a pointer to a deferred parallel object that is an output of the deferred parallel operation, and a function to be (but has not yet been) performed on the input object.

The method also includes executing the deferred, combined parallel operations to produce materialized parallel data objects corresponding to the deferred parallel data objects. Materialized parallel data objects, for example, can be data structures that include the data or elements of the parallel data object. For at least one of the deferred, combined parallel operations, executing the at least one deferred, combined parallel operation includes determining an estimated size of data associated with the at least one deferred, combined parallel operation; determining whether the estimated size exceeds a threshold size; if the estimated size is below a threshold size, execute the at least one deferred, combined parallel operation as a local, sequential operation; and if the estimated size exceeds a threshold size, execute the at least one deferred, combined parallel operation as remote, parallel operation.

Implementations of this aspect may include one or more of the following features. For example, the data associated with the at least one deferred, combined parallel operation may include one or more of input data for the at least one deferred, combined parallel operation, intermediary data produced by the at least one deferred, combined parallel operation, or output data produced by the at least one deferred, combined parallel operation. The at least one deferred, combined parallel data operation may be a generalized mapreduce operation. The generalized mapreduce operation may include multiple, parallel map operations and multiple, parallel reduce operations and be translatable to a single mapreduce operation that includes a single map function to implement the multiple, parallel map operations and a single reduce function to implement the multiple, parallel reduce operations. Executing the generalized mapreduce operation may include translating the combined mapreduce operation to the single mapreduce operation and executing the single mapreduce operation. Executing the single mapreduce operation as a remote, parallel operation may include causing the single mapreduce operation to be copied and executed on multiple, different processing modules in a datacenter. Translating the generalized mapreduce operation to the single mapreduce operation may include generating a map function that includes the multiple map operations and a reducer function that includes the multiple reducer operations. Determining the estimated size may include accessing annotations in the dataflow graph that reflect an estimate of the size of the data associated with the at least one deferred, combined parallel operation.

In one aspect, a system includes one or more processing devices and one or more storage devices. The storage devices store instructions that, when executed by the one or more processing devices, implement an executor. The executor is configured to access a dataflow graph that includes deferred parallel data objects and deferred, combined parallel data operations. Deferred parallel data objects, for example, can be data structures that include a pointer to the parallel data operation that operates on the parallel data objects, rather than the elements stored in the parallel data object. Deferred parallel operations, for example, can be data structures that include a pointer to a parallel data object that is an input to the deferred parallel operation, a pointer to a deferred parallel object that is an output of the deferred parallel operation, and a function to be (but has not yet been) performed on the input object.

At least one of the deferred, combined parallel data operation is a generalized mapreduce operation. The generalized mapreduce operation includes multiple, parallel map operations and multiple, parallel reduce operations and is translatable to a single mapreduce operation that includes a single map function to implement the multiple, parallel map operations and a single reduce function to implement the multiple, parallel reduce operations.

The executor is further configured to execute the deferred, combined parallel operations to produce materialized parallel data objects corresponding to the deferred parallel data objects. Materialized parallel data objects, for example, can be data structures that include the data or elements of the parallel data object. To execute the generalized mapreduce operation, the executor is configured to translate the combined mapreduce operation to the single mapreduce operation and execute the single mapreduce operation.

Implementations of this aspect may include one or more of the following features. For example, to translate the generalized mapreduce operation to the single mapreduce operation, the executor may be configured to generate a map function that includes the multiple map operations and a reduce function that includes the multiple reduce operations.

The executor may be configured to execute the single mapreduce operation as a remote, parallel operation. To execute the single mapreduce operation as a remote, parallel operation, the executor may be configured to cause the single mapreduce operation to be executed by multiple worker processes on multiple, different processing modules. To cause the single map reduce operation to be executed by multiple worker processes, the executor may be configured to cause multiple map worker processes to be invoked for each of the map operations, where each of the multiple map worker processes is assigned an index number. Each of the map worker processes may be configured to receive the map function that implements the multiple map operations, one or more inputs associated with one of the map operations, and the map worker process' associated index, select the map operation associated with the inputs based on the map worker process' associated index, and invoke the selected map operation on the one or more inputs.

To cause the single map reduce operation to be executed by multiple worker processes, the executor may be configured to cause multiple reduce worker processes to be invoked for each of the reduce operations, where each of the multiple reduce worker processes is assigned an index number. Each of the multiple reduce worker processes may be configured to receive the reduce function that implements the multiple reduce operations, one or more inputs associated with one of the reduce operations, and the reduce worker process' associated index, select the reduce operation associated with the inputs based on the worker process' associated index, and invoke the selected reduce operation on the one or more inputs.

In another aspect, a method includes accessing a dataflow graph that includes deferred parallel data objects and deferred, combined parallel data operations. Deferred parallel data objects, for example, can be data structures that include a pointer to the parallel data operation that operates on the parallel data objects, rather than the elements stored in the parallel data object. Deferred parallel operations, for example, can be data structures that include a pointer to a parallel data object that is an input to the deferred parallel operation, a pointer to a deferred parallel object that is an output of the deferred parallel operation, and a function to be (but has not yet.

At least one of the deferred, combined parallel data operation is a generalized mapreduce operation. The generalized mapreduce operation includes multiple, parallel map operations and multiple, parallel reduce operations and being translatable to a single mapreduce operation that includes a single map function to implement the multiple, parallel map operations and a single reduce function to implement the multiple, parallel reduce operations; and The method also includes executing the deferred, combined parallel operations to produce materialized parallel data objects corresponding to the deferred parallel data objects. Materialized parallel data objects, for example, can be data structures that include the data or elements of the parallel data object. Executing the generalized mapreduce operation includes translating the combined mapreduce operation to the single mapreduce operation and executing the single mapreduce operation.

Implementations of this aspect may include one or more of the following features. For example, translating the generalized mapreduce operation to the single mapreduce operation may include generating a map function that includes the multiple map operations and a reduce function that includes the multiple reduce operations. Executing the single mapreduce operation may include executing the single mapreduce operation as a remote, parallel operation. Executing the single mapreduce operation as a remote, parallel operation may include causing the single mapreduce operation to be executed by multiple worker processes on multiple, different processing modules.

Causing the single map reduce operation to be executed by multiple worker processes may include causing the multiple map worker processes to be invoked for each of the map operations, where each of the multiple map worker processes is assigned an index number. Each of the map worker processes may be configured to receive the map function that implements the multiple map operations, one or more inputs associated with one of the map operations, and the map worker process' associated index, select the map operation associated with the inputs based on the map worker process' associated index, and invoke the selected map operation on the one or more inputs.

Causing the single map reduce operation to be executed by multiple worker processes may include causing multiple reduce worker processes to be invoked for each of the reduce operations, where each of the multiple reduce worker processes is assigned an index number. Each of the multiple reduce worker processes may be configured to receive the reduce function that implements the multiple reduce operations, one or more inputs associated with one of the reduce operations, and the reduce worker process' associated index, select the reduce operation associated with the inputs based on the worker process' associated index, and invoke the selected reduce operation on the one or more inputs.

DETAILED DESCRIPTION

In general, the techniques described in this document can be applied to large-scale data processing and, in particular, to large scale data-parallel pipelines. Such large-scale processing may be performed in a distributed data processing system, such as a datacenter or a network of datacenters. For example, large-scale Internet services and the massively parallel computing infrastructure that support such services may employ warehouse-sized computing systems, made up of thousands or tens of thousands of computing nodes.

Figure 1:
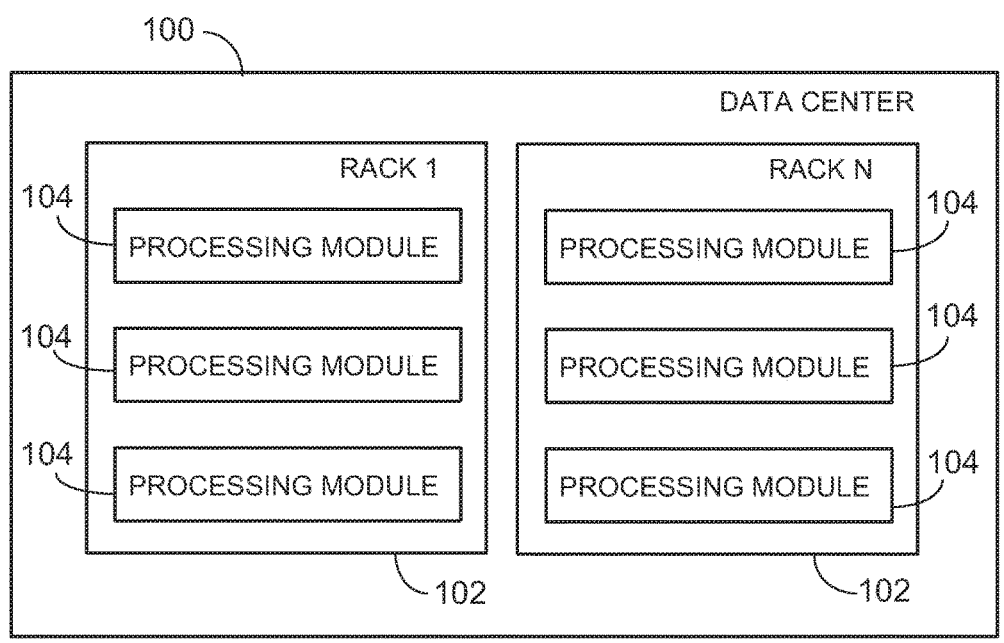
FIG. 1 is a block diagram illustrating an example of a datacenter.

FIG. 1 is a block diagram illustrating an example of a datacenter 100. The datacenter 100 is used to store data, perform computational tasks, and transmit data to other systems outside of the datacenter using, for example, a network connected to the datacenter. In particular, the datacenter 100 may perform large-scale data processing on massive amounts of data.

The datacenter 100 includes multiple racks 102. While only two racks are shown, the datacenter 100 may have many more racks. Each rack 102 can include a frame or cabinet into which components, such as processing modules 104, are mounted. In general, each processing module 104 can include a circuit board, such as a motherboard, on which a variety of computer-related components are mounted to perform data processing. The processing modules 104 within each rack 102 are interconnected to one another through, for example, a rack switch, and the racks 102 within each datacenter 100 are also interconnected through, for example, a datacenter switch.

In some implementations, the processing modules 104 may each take on a role as a master or slave. The master modules control scheduling and data distribution tasks amongst themselves and the slaves. A rack can include storage (e.g., one or more network attached disks) that is shared by the one or more processing modules 104 and/or each processing module 104 may include its own storage. Additionally, or alternatively, there may be remote storage connected to the racks through a network.

The datacenter 100 may include dedicated optical links or other dedicated communication channels, as well as supporting hardware, such as modems, bridges, routers, switches, wireless antennas and towers, and the like. The datacenter 100 may include one or more wide area networks (WANs) as well as multiple local area networks (LANs).

Figure 2:
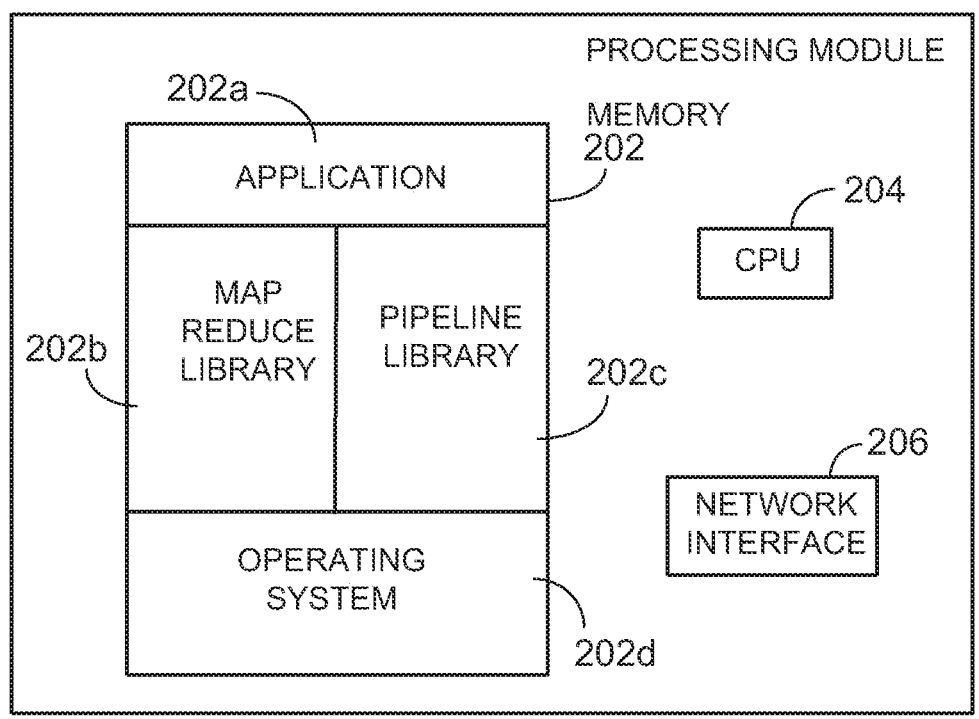
FIG. 2 is a block diagram of an example of a processing module.

FIG. 2 is a block diagram of an example of a processing module 200, which may be used for one or more of the processing modules 104. The processing module 200 includes memory 202, one or more processing units (CPUs) 204, and one or more network or other communication interfaces 206. These components are interconnected by one or more communication buses. In some implementations, the processing module 200 may include an input/output (I/O) interface connecting the processing module to input and output devices such as a display and a keyboard. Memory 202 may include high speed random access memory and may also include non-volatile memory, such as one or more magnetic disk storage devices. Memory 202 may include mass storage that is remotely located from the CPU 204.

The memory 202 stores application software 202a, a mapreduce library 202b, a pipeline library 202c, and an operating system 202d (e.g., Linux). The operating system 202d generally includes procedures for handling various basic system services and for performing hardware dependent tasks. The application software 202a performs large-scale data processing.

The libraries 202b and 202c provide functions and classes that may be employed by the application software 202a to perform large-scale data processing and implement data-parallel pipelines in such large-scale data processing. The mapreduce library 202b can support the MapReduce programming model for processing massive amounts of data in parallel. The MapReduce model is described in, for example, MapReduce: Simplified Data Processing on Large Clusters, OSDI'04: Sixth Symposium on Operating System Design and Implementation, San Francisco, Calif., December, 2004 and U.S. Pat. No. 7,650,331, both of which are incorporated by reference.

In general, the MapReduce model provides an abstraction to application developers for how to think about their computations. The application developers can formulate their computations according to the abstraction, which can simplify the building of programs to perform large-scale parallel-data processing. The application developers can employ the MapReduce model with or without using the mapreduce library 202b. The mapreduce library 202b, however, can manage many of the difficult low-level tasks. Such low-level tasks may include, for example, selecting appropriate parallel worker machines, distributing to them the program to run, managing the temporary storage and flow of intermediate data between the three phases, synchronizing the overall sequencing of the phases, and coping with transient failures of machines, networks, and software.

The MapReduce model generally involves breaking computations down into a mapreduce operation, which includes a single map operation and a single reduce operation. The map operation performs an operation on each of the logical records in the input to compute a set of intermediate key/value pairs. The reduce operation performs an operation on the values that share the same key to combine the values in some manner. Implicit in this model is a shuffle operation, which involves grouping all of the values with the same key.

The mapreduce library 202b may implement a map phase, a shuffle phase, and a reduce phase to support computations formulated according to the MapReduce model. In some implementations, to use the mapreduce library 202b, a user program (or another library, such as pipeline library 202c) calls the mapreduce library 202b, specifying information identifying the input file(s), information identifying or specifying the output files to receive output data, and two application-specific data processing operators, the map operator and the reduce operator. Generally, the map operator specifies a map function that processes the input data to produce intermediate data and the reduce operator specifies a reduce function that merges or otherwise combines the intermediate data values. The mapreduce library 202b then employs this information to implement that map phase, the shuffle phase, and the reduce phase.

The map phase starts by reading a collection of values or key/value pairs from an input source, such as a text file, binary record-oriented file, or MySql database. Large data sets may be represented by multiple, even thousands, of files (which may be referred to as shards), and multiple file shards can be read as a single logical input source. The map phase then invokes the user-defined function, the map function or Mapper, on each element, independently and in parallel. For each input element, the user-defined function emits zero or more key/value pairs, which are the outputs of the map phase.

The shuffle phase takes the key/value pairs emitted by the Mappers and groups together all the key/value pairs with the same key. The shuffle phase then outputs each distinct key and a stream of all the values with that key to the next phase, the reduce phase.

The reduce phase takes the key-grouped data emitted by the shuffle phase and invokes the user-defined function, the reduce function or Reducer, on each distinct key-and-values group, independently and in parallel. Each Reducer invocation is passed a key and an iterator over all the values associated with that key, and emits zero or more replacement values to associate with the input key. The Reducer typically performs some kind of aggregation over all the values with a given key. For some operations, the Reducer is just the identity function. The key/value pairs emitted from all the Reducer calls are then written to an output sink, e.g., a sharded file or database.

To implement these phases, the mapreduce library 202b may divide the input pieces into M pieces (for example, into 64 megabyte (MB) sized files) and start up multiple copies of the program that uses the library 202b on a cluster of machines, such as multiple ones of the processing modules 104. One of the copies may be a master copy and the rest may be worker copies that are assigned work by the master. The master selects idle workers and assigns each one a map task or a reduce task. There are M map tasks (one for each input piece). The workers assigned to a map task use the Mapper to perform the mapping operation on the inputs to produce the intermediate results, which are divided, for example, into R sets. When the intermediate results are divided into R sets, there are R reduce tasks to assign. The workers assigned to a reduce task use the Reducer to perform the reduce operation on the intermediate values to produce the output. Once all map tasks and all reduce tasks are completed, the master returns to the user program or library employing the mapreduce library 202b. As a result, the mapreduce operation is implemented as a set of parallel operations across a cluster of processing devices.

For Reducers that first combine all the values with a given key using an associative, commutative operation, a separate user-defined Combiner function can be specified to perform partial combining of values associated with a given key during the map phase. Each map worker can keep a cache of key/value pairs that have been emitted from the Mapper, and use the Combiner function to combine locally as much as possible before sending the combined key/value pairs on to the Shuffle phase. The Reducer may complete the combining step by combining values from different map workers.

By default, the Shuffle phase may send each key-and-values group to arbitrarily but deterministically chosen reduce worker machine, with this choice determining which output file shard will hold that key's results. Alternatively, a user defined Sharder function can be specified that selects which reduce worker machine should receive the group for a given key. A user-defined Sharder can be used to aid in load balancing. The user-defined Sharder can also be used to sort the output keys into reduce "buckets," with all the keys of the $i_{th}$ reduce worker being ordered before all the keys of the $i_{th}+1$st reduce worker. Coupled with the fact that each reduce worker processes keys in lexicographic order, this kind of Sharder can be used to produce sorted output.

The pipeline library 202c provides functions and classes that support data-parallel pipelines and, in particular, pipelines that include chains or directed acyclic graphs of mapreduce operations. The pipeline library 202c may help alleviate some of the burdens of implementing chains of mapreduce operations. In general, many real-world computations require a chain of mapreduce stages. While some logical computations can be expressed as a mapreduce operation, others require a sequence or graph of mapreduce operations. As the complexity of the logical computations grows, the challenge of mapping the computations into physical sequences of mapreduce operations increases. Higher-level concepts such as "count the number of occurrences" or "join tables by key" are generally hand-compiled into lower-level mapreduce operations. In addition, the user may take on the additional burdens of writing a driver program to invoke the mapreduce operations in the proper sequence, and managing the creation and deletion of intermediate files holding the data.

The pipeline library 202c may obviate or reduce some of the difficulty in producing data-parallel pipelines that involve multiple mapreduce operations, as well as the need for the developer to produce additional coordination code to chain together the separate mapreduce stages in such data-parallel pipelines. The pipeline library 202c also may obviate or reduce additional work to manage the creation and later deletion of the intermediate results in between pipeline stages. As a result, the pipeline library 202c may help prevent the logical computation itself from becoming hidden among all the low-level coordination details, thereby making it easier for new developers to understand the computation. Moreover, making use of the pipeline library 202c may help prevent the division of the pipeline into particular stages from becoming "baked in" to the code and difficult to change later if the logical computation needs to evolve.

In general, the application software 202a may employ one or both of the libraries 202b or 202c. An application developer may develop application software that employs the mapreduce library 202b to perform computations formulated as a mapreduce operation.

The application developer may alternatively, or additionally, employ the pipeline library 202c when developing a data-parallel pipeline that includes multiple mapreduce operations. As discussed further below, the pipeline library 202c may allow the developer to code the computations in a more natural manner, using the native programming language in which the pipeline library 202c is implemented, without thinking about casting the logical computation in terms of mapreduce operations or building an ordered graph of operations. The pipeline library 202c can formulate the logical computation in terms of multiple mapreduce operations prior to execution, and then execute the computation either by implementing the mapreduce operations itself, or interfacing with the mapreduce library 202b to implement the mapreduce operations.

Figure 3:
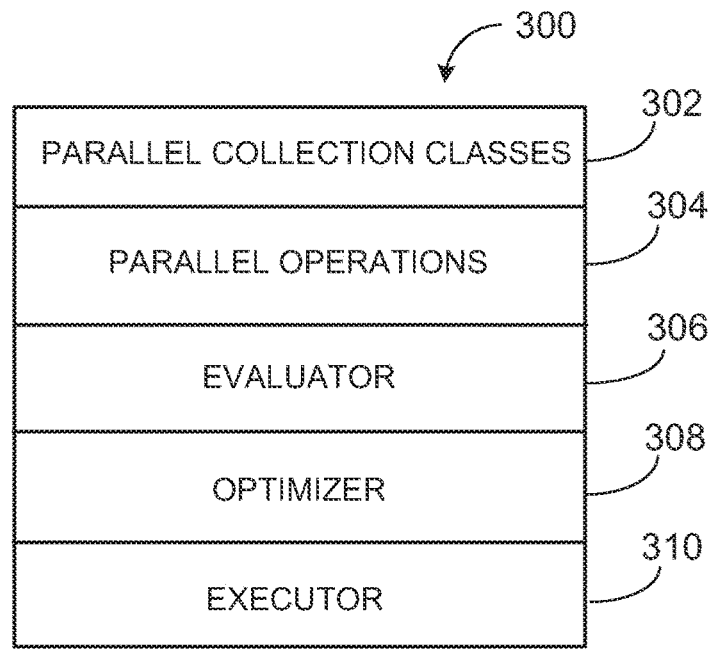
FIG. 3 is a block diagram illustrating an example of a pipeline library.

FIG. 3 is a block diagram illustrating an example of a pipeline library 300 that may be used to implement pipeline library 200c. The pipeline library 300 includes one or more parallel data collection classes 302, one or more parallel operations 304, an evaluator 306, an optimizer 308, and an executor 310. In general, the parallel data collection classes 302 are used to instantiate parallel data objects that hold a collection of data, and the parallel operations 304 are used to perform parallel operations on the data held by the parallel data objects. The parallel operations 304 may be composed to implement data-parallel computations and an entire pipeline, or even multiple pipelines, can be implemented using the parallel collection classes 302 and parallel operations 304.

Parallel data collection classes 302 and operations 304 present a simple, high-level, uniform abstraction over many different data representations and over different execution strategies. The parallel data collection classes 302 abstract away the details of how data is represented, including whether the data is represented as an in-memory data structure, as one or more files, or as an external storage service. Similarly, parallel operations 304 abstract away their implementation strategy, such as whether an operation is implemented as a local, sequential loop, as a remote parallel invocation of the mapreduce library 202b, as a query on a database, or as a streaming computation.

Rather than evaluate the parallel operations as they are traversed when the data parallel pipeline is executed, the evaluator 306 defers the evaluation of parallel operations. Instead, the evaluator 306 constructs an internal execution plan dataflow graph that contains the operations and their arguments. Once the execution plan dataflow graph for the whole logical computation is constructed, the optimizer 308 revises the execution plan, for example, by applying graph transformations that fuse or combine chains of parallel operations together into a smaller number of combined operations. The revised execution plan may include a generalized mapreduce operation that includes multiple, parallel map operations and multiple, parallel reduce operations (for example, the MapShuffleCombineReduce operation described further below), but which can be translated to a single mapreduce operation with a single map function to implement the multiple map operations and a single reduce function to implement the multiple reduce operations. The executor 310 executes the revised operations using underlying primitives (e.g., MapReduce operations). When running the execution plan, the executor 310 may choose which strategy to use to implement each operation (e.g., local sequential loop vs. remote parallel MapReduce) based in part on the size of the data being processed. The executor 310 also may place remote computations near the data on which they operate, and may perform independent operations in parallel. The executor 310 also may manage the creation and cleanup of any intermediate files needed within the computation.

The pipeline library 300 may be implemented in any of a number of programming languages. The following describes examples of aspects of an implementation in the Java programming language.

The pipeline library 300 provides a parallel data collection class referred to as a PCollection<T>, which is an immutable bag of elements of type T. A PCollection can either have a well-defined order (called a sequence), or the elements can be unordered (called a collection). Because they are less constrained, collections may be more efficient to generate and process than sequences. A PCollection<T> can be created by reading a file in one of several possible formats. For example, a text file can be read as a PCollection<String>, and a binary record-oriented file can be read as a PCollection<T>, given a specification of how to decode each binary record into an object of type T. When the pipeline library 300 is implemented using Java, a PCollection<T> may also be created from an in-memory Java Collection<T>.

Data sets represented by multiple file shards can be read in as a single logical PCollection. For example:

PCollection<String> lines=readTextFileCollection("/gfs/data/shakes/hamlet.txt");
PCollection<DocInfo> docInfos=readRecordFileCollection("/gfs/webdocinfo/part-*", recordsOf(DocInfo.class));

In this example, recordsOf( . . . ) specifies a particular way in which a DocInfo instance is encoded as a binary record. Other predefined encoding specifiers may include strings( ) for UTF-8-encoded text, ints( ) for a variable-length encoding of 32-bit integers, and pairsOf(e1,e2) for an encoding of pairs derived from the encodings of the components. Some implementations may allow users to specify their own custom encodings.

A second parallel data collection class 302 is PTable<K,V>, which represents an (immutable multi-map with keys of type K and values of type V. PTable<K,V> may be just an unordered bag of pairs. Some of the parallel operations 304 may apply only to PCollections of pairs, and in Java PTable<K,V> may be implemented as a subclass of PCollection<Pair<K,V>> to capture this abstraction. In another language, PTable<K,V> might be defined as a type synonym of PCollection<Pair<K,V>>.

The parallel data objects, such as PCollections, may be implemented as first class objects of the native language in which the library 300 is implemented. When this is the case, the objects may be manipulable like other objects in the native language. For example, the PCollections may be able to be passed into and returned from regular methods in the language, and may be able to be stored in other data structures of the language (although some implementations may prevent the PCollections from being stored in other PCollections). Also, regular control flow constructs of the native language may be able to be used to define computations involving objects, including functions, conditionals, and loops. For example, if Java is the native language:

Collection<PCollection<T2>> pcs =
    new ArrayList<...>( );

```
        for (Task task : tasks) {
            PCollection<T1> p1 = ...;
            PCollection<T2> p2;
            if (isFirstKind(task)) {
                p2 = doSomeWork(p1);
            } else {
                p2 = doSomeOtherWork(p1);
            }
            pcs.add(p2);
        }
```

Implementing the parallel data objects as first class objects in the native language of the library 300 may simplify the development of programs using the library, since the developer can use the parallel data objects in the same manner he or she would use other objects.

In addition to the parallel data collection classes, the pipeline library 300 can also include a single data collection class PObject<T> to support the ability to inspect the contents of PCollections during the execution of a pipeline. In contrast to a PCollection, which holds multiple elements, a PObject<T> is a container for a single object of type T (for example, a single native object (e.g., Java object) of type T) and any associated methods of PObjects are designed to operate on a single element. Like PCollections, PObjects can be either deferred or materialized (as described further below), allowing them to be computed as results of deferred operations in pipelines. Once a pipeline is run, the contents of a now-materialized PObject can be extracted using getValue( ).

For example, in an implementation using Java, an asSequentialCollection( ) operation can be applied to a PCollection<T> to yield a PObject<Collection<T>>, which can be inspected once the pipeline runs to read out all the elements of the computed PCollection as a regular Java in-memory Collection:

```
    PTable<String,Integer> wordCounts = ...;
    PObject<Collection<Pair<String,Integer>>> result =
        wordCounts.asSequentialCollection( );
    ...
    FlumeJava.run( );
    for (Pair<String,Integer> count : result.getValue( )) {
        System.out.print(count.first + ": " + count.second);
    }
```

As another example, the combine( ) operation (described below) applied to a PCollection<T> and a combining function over Ts yields a PObject<T> representing the fully combined result. Global sums and maxima can be computed this way.

The contents of PObjects also may be able to be examined within the execution of a pipeline, for example, using an operate( ) primitive provided by the pipeline library 300. The operate( ) primitive takes a list of PObjects and an argument OperateFn (which defines the operation to be performed on each PObject), and returns a list of PObjects. When evaluated, operate( ) extracts the contents of the now-materialized argument PObjects, and passes them into the argument OperateFn. The OperateFn returns a list of native objects, such as Java objects, and operate( ) wraps these native objects inside of PObjects, which are returned as the results. Using this primitive, arbitrary computations can be embedded within a pipeline and executed in deferred fashion. In other words, operations other than ParallelDo operations (described below), which operate on PCollections that contain multiple elements, can be included in the pipeline. For example, consider embedding a call to an external service that reads and writes files:

```
    // Compute the URLs to crawl:
    PCollection<URL> urlsToCrawl = ...;
    // Crawl them, via an external service:
    PObject<String> fileOfUrlsToCrawl =
        urlsToCrawl.viewAsFile(TEXT);
    PObject<String> fileOfCrawledDocs =
        operate(fileOfUrlsToCrawl, new OperateFn( ) {
            String operate(String fileOfUrlsToCrawl) {
                return crawlUrls(fileOfUrlsToCrawl);
            }
        });
    PCollection<DocInfo> docInfos =
        readRecordFileCollection(fileOfCrawledDocs,
        recordsOf(DocInfo.class));
    // Use the crawled documents.
```

This example uses operations for converting between PCollections and PObjects containing file names. The viewAsFile( ) operation applied to a PCollection and a file format choice yields a PObject<String> containing the name of a temporary sharded file of the chosen format where the PCollection's contents may be found during execution of the pipeline. File-reading operations such as readRecordFileCollection( ) may be overloaded to allow reading files whose names are contained in PObjects.

In much the same way, the contents of PObjects can also be examined inside a DoFn (described below) by passing them in as side inputs to parallelDo( ). Normally, a DoFn performs an operation on each element of a PCollection, and just receives the PCollection as an input. In some cases, the operation on each PCollection may involve a value or other data stored in a PObject. In this case, the DoFn may receive the PCollection as an input, as normal, and a PObject as a side input. When the pipeline is run and the parallelDo( ) operation is eventually evaluated, the contents of any now-materialized PObject side inputs are extracted and provided to the user's DoFn, and then the DoFn is invoked on each element of the input PCollection to perform the defined operation on the element using the data from the PObject(s). For example:

```
    PCollection<Integer> values = ...;
    PObject<Integer> pMaxValue = values.combine(MAX_INTS);
    PCollection<DocInfo> docInfos = ...;
    PCollection<Strings> results = docInfos.parallelDo(
        pMaxValue,
        new DoFn<DocInfo,String>( ) {
            private int maxValue;
            void setSideInputs(Integer maxValue) {
                this.maxValue = maxValue;
            }
            void process(DocInfo docInfo, EmitFn<String> emitFn) {
                ... use docInfo and maxValue ...
            }
        }, collectionOf(strings( )));
```

As described above, data-parallel operations 304 are invoked on parallel data objects, such as PCollections. The pipeline library 300 defines some primitive data-parallel operations, with other operations being implemented in terms of these primitives. One of the data-parallel primitives is parallelDo( ) which supports elementwise computation over an input PCollection<T> to produce a new output PCollection<S>. This operation takes as its main argument a DoFn<T, S>, a function-like object defining how to map each value in the input PCollection<T> into zero or more values to appear in the output PCollection<S>. This operation also takes an indication of the kind of PCollection or PTable to produce as a result. For example:

```
PCollection<String> words =
    lines.parallelDo(new DoFn<String,String>( ) {
        void process(String line, EmitFn<String> emitFn) {
            for (String word : splitIntoWords(line)) {
                emitFn.emit(word);
            }
        }
    }, collectionOf(strings( )));
```

In this code, collectionOf(strings( )) specifies that the parallelDo( ) operation should produce an unordered PCollection whose String elements should be encoded using UTF-8. Other options may include sequenceOf(elemEncoding) for ordered PCollections and tableOf(keyEncoding, valueEncoding) for PTables. emitFn is a call-back function passed to the user's process( . . . ) method, which should invoke emitFn.emit (outElem) for each outElem that should be added to the output PCollection. Subclasses of DoFn may be included, such as MapFn (implementing a map) and FilterFn (implementing a filter) to provide simpler interfaces in some cases.

The operation parallelDo( ) can be used to express both the map and reduce parts of a MapReduce operation. The library 300 also may include a version of parallelDo( ) that allows multiple output PCollections to be produced simultaneously from a single traversal of the input PCollection.

DoFn functions may be prevented from accessing any global mutable state of the enclosing program if DoFn functions can be distributed remotely and run in parallel. DoFn objects may be able to maintain local instance variable state, but there may be multiple DoFn replicas operating concurrently with no shared state.

A second primitive, groupByKey( ), converts a multimap of type PTable<K,V> (which can have many key/value pairs with the same key) into a uni-map of type PTable<K, Collection<V>> where each key maps to an unordered collection of all the values with that key. For example, the following computes a table mapping URLs to the collection of documents that link to them:

```
PTable<URL,DocInfo> backlinks =
    docInfos.parallelDo(new DoFn<DocInfo,
        Pair<URL,DocInfo>>( ) {
            void process(DocInfo docInfo,
                EmitFn<Pair<URL,DocInfo>> emitFn)
{           for (URL targetUrl : docInfo.getLinks( )) {
                emitFn.emit(Pair.of(targetUrl, docInfo));
            }
        }
    }, tableOf(recordsOf(URL.class), recordsOf(DocInfo.class)));
PTable<URL, Collection<DocInfo>> referringDocInfos =
    backlinks.groupByKey( );
```

The operation groupByKey( ) corresponds to the shuffle step of MapReduce. There also be a variant that allows specifying a sorting order for the collection of values for each key.

A third primitive, combineValues( ) takes an input PTable<K, Collection<V>> and an associative combining function on Vs, and returns a PTable<K,V> where each input collection of values has been combined into a single output value. For example:

```
PTable<String,Integer> wordsWithOnes =
    words.parallelDo(
        new DoFn<String, Pair<String,Integer>>( ) {
            void process(String word, EmitFn<Pair<String,Integer>>
                emitFn) {
                    emitFn.emit(Pair.of(word, 1));
            }
        }, tableOf(strings( ), ints( )));
PTable<String,Collection<Integer>> groupedWordsWithOnes =
    wordsWithOnes.groupByKey( );
PTable<String,Integer> wordCounts =
    groupedWordsWithOnes.combineValues(SUM_INTS);
```

The operation combineValues( ) is semantically a special case of parallelDo( ) but the associativity of the combining function allows the operation to be implemented through a combination of a MapReduce Combiner (which runs as part of each mapper) and a MapReduce Reducer (to finish the combining), which may be more efficient than doing all the combining in the reducer.

A fourth primitive, flatten( ) takes a list of PCollection<T>s and returns a single PCollection<T> that contains all the elements of the input PCollections. The operation flatten( ) may not actually copy the inputs, but rather just view the inputs as if the inputs were one logical PCollection.

A pipeline typically concludes with operations that write the final resulting PCollections to external storage. For example:
    wordCounts.writeToRecordFileTable("/gfs/data/shakes/hamlet-counts.records");

The pipeline library 300 may include a number of other operations on PCollections that are derived in terms of the above-described primitives. These derived operations may be the same as helper functions the user could write. For example, a count( ) operation takes a PCollection<T> and returns a PTable<T,Integer> mapping each distinct element of the input PCollection to the number of times the element occurs. This function may be implemented in terms of parallelDo( ) groupByKey( ), and combineValues( ) using the same pattern as was used to compute wordCounts above. The code above can be simplified to the following:
    PTable<String,Integer> wordCounts=words.count( ).

Another operation, join( ) implements a join over two or more PTables sharing a common key type. When applied to a multimap PTable<K,V1> and a multimap PTable<K,V2>, join( ) returns a unimap PTable<K, Pair<Collection<V1>, Collection<V2>>> that maps each key in either of the input tables to the collection of all values with that key in the first table, and the collection of all values with that key in the second table. This resulting table can be processed further to compute a traditional inner or outer-join, but it may be more efficient to be able to manipulate the value collections directly without computing their cross-product.

The operation join( ) may be implemented as follows:
  1. Apply parallelDo( ) to each input PTable<K,Vi> to convert it into a common format of type PTable<K, TaggedUnion<V1,V2>>.
  2. Combine the tables using flatten( ).
  3. Apply groupByKey( ) to the flattened table to produce a PTable<K, Collection<TaggedUnion<V1,V2>>>.
  4. Apply parallelDo( ) to the key-grouped table, converting each Collection<TaggedUnion<V1,V2>> into a Pair of a Collection<V1> and a Collection<V2>.

Another derived operation is top( ), which takes a comparison function and a count N and returns the greatest N elements of its receiver PCollection according to the comparison function. This operation may be implemented on top of parallelDo( ), groupByKey( ), and combineValues( ).

The operations mentioned above to read multiple file shards as a single PCollection are derived operations too, implemented using flatten( ) and the single-file read primitives.

As described above, the pipeline library 300 executes parallel operations lazily, using deferred evaluation. To that end, the evaluator 306 defers the evaluation of parallel operations, and instead constructs an internal execution plan dataflow graph that contains the operations and the arguments of the operations. Each parallel data object, such as a PCollection, is represented internally either in deferred (not yet computed) or materialized (computed) state. A deferred parallel data object, for example, holds a pointer to the deferred operation that computes the parallel data object. A deferred operation, in turn, may hold references to the parallel data objects that are the arguments of the deferred operation (which may themselves be deferred or materialized) and the deferred parallel data objects that are the results of the operation. When a library operation like parallelDo( ) is called, the library 300 creates a ParallelDo deferred operation object and returns a new deferred PCollection that points to the operation. In other words, as the data parallel pipeline is executed, the evaluator 306 converts the parallel data objects and parallel operations into a directed acyclic graph of deferred (unevaluated) objects and operations. This graph may be referred to as the execution plan or execution plan dataflow graph.

The optimizer 308 fuses chains or subgraphs of parallel operations in the dataflow graph together into a smaller number of operations (some of which may be combined operations), which the executor 310 can then execute using an underlying primitive or other logic. The optimizer 308 may be written, for example, as a series of independent graph transformations. In one implementation, the optimizer 308 performs a series of passes over the initial execution plan that reduces the number of overall operations and groups operations, with the overall goal of producing the fewest MapShuffleCombineReduce (MSCR) operations.

An MSCR operation includes a combination of ParallelDo, GroupByKey, CombineValues, and Flatten operations. An MSCR operation can be mapped to and run as a single mapreduce operation. An MSCR operation has M input channels (each performing a map operation) and R output channels (each performing a shuffle, a combine, and a reduce). Each input channel m takes a PCollection<$T_m$> as input and performs an R-output ParallelDo "map" operation on that input to produce R outputs of type PTable<$K_r,V_r$>s. Each output channel R flattens its M inputs and then either (a) performs a GroupByKey "shuffle," an optional CombineValues "combine," and a $O_r$-output ParallelDo "reduce" (which defaults to the identity operation), and then writes the results to $O_r$ output PCollections or (b) writes the input directly as the output. The former kind of output channel may be referred to as a "grouping" channel, while the latter kind of output channel may be referred to as a "pass-through" channel. A pass-through channel may allow the output of a mapper be a result of an MSCR operation.

Figure 8:
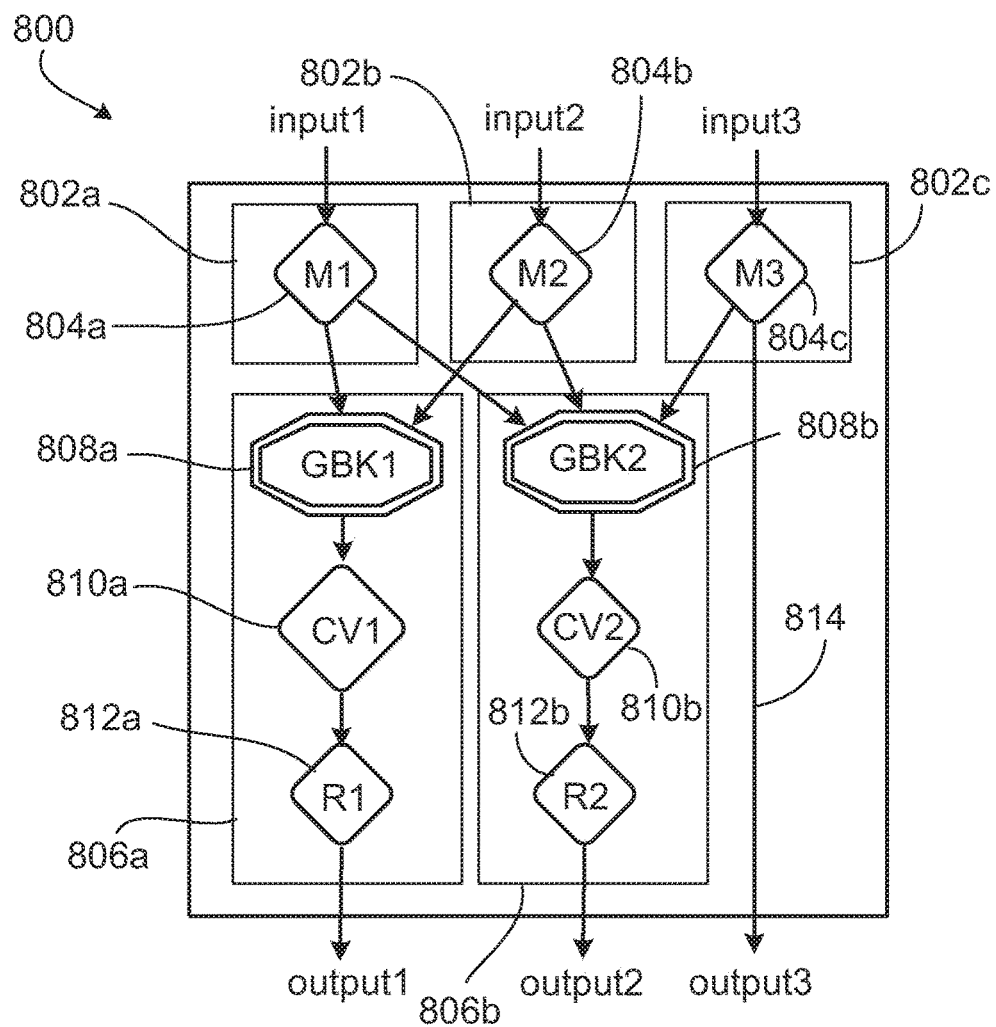
FIG. 8 illustrates an example of an MSCR operation with 3 input channels.

FIG. 8 illustrates an example of an MSCR operation 800 with 3 input channels 802a, 802b, and 802c. The first input channel 802a performs a ParallelDo M1 804a. The second input channel 802b performs a ParallelDo M2 804b. The third input channel 802c performs a ParallelDo M3 804c. The MSCR operation includes two grouping output channels 806a and 806b. The first grouping output channel 806a includes a GroupByKey GBK1 808a, CombineValues CV1 810a, and a reducing ParallelDo R1 812a. Similarly, the second grouping output channel includes a GroupByKey GBK2 808b, CombineValues CV2 810b, and a reducing ParallelDo R2 812b. The MSCR operation 800 also includes one pass-through output channel 814.

MSCR generalizes the MapReduce model by allowing multiple mappers and multiple reducers and combiners, by allowing each reducer to produce multiple outputs, by removing the requirement that the reducer must produce outputs with the same key as the reducer input, and by allowing pass-through outputs. Thus, any given MSCR may include multiple, parallel map operations that each operate on different inputs and multiple reduce operations that operate on the outputs of the map operations to produce multiple different outputs. Despite its apparent greater expressiveness, each MSCR operation can be implemented using a single mapreduce operation that includes a single map function to implement the map operations on the different inputs and a single reduce function to implement the reduce operations to produce the multiple outputs.

Once the execution plan is revised by the optimizer 308, the executor 310 executes the revised execution plan dataflow graph. In one implementation, the pipeline library 300 performs batch execution. In other words, the executor 310 traverses the operations in the revised execution plan in forward topological order, and executes each one in turn. Independent operations may be able to be executed simultaneously. Alternatively, incremental or continuous execution of pipelines may be implemented, where incrementally added inputs lead to quick, incremental update of outputs. Further, optimization may be performed across pipelines run by multiple users over common data sources.

The executor 310 executes operations other than a MSCR by performing the appropriate computations that perform the operation. MSCRs are mapped to a single mapreduce operation, which is then executed.

In some implementations, the executor 310 first decides whether the mapreduce operation should be run locally and sequentially, or as a remote, parallel mapreduce operation (using, for example, mapreduce library 202b). Since there is overhead in launching a remote, parallel job, local evaluation may be used for modest-size inputs where the gain from parallel processing is outweighed by the start-up overheads. Modest-size data sets may be common during development and testing. Using local evaluation for these data sets may therefore facilitate the use of regular IDEs, debuggers, profilers, and related tools, easing the task of developing programs that include data-parallel computations.

If the input data set appears large (e.g., greater than or equal 64 Megabytes), the executor 310 may choose to launch a remote, parallel MapReduce operation using the mapreduce library 202b. The executor 310 may use observations of the input data sizes and estimates of the output data sizes to automatically choose a reasonable number of parallel worker machines. Users can assist in estimating output data sizes, for example by augmenting a DoFn with a method that returns the expected ratio of output data size to input data size, based on the computation represented by that DoFn. Estimates may be refined through dynamic monitoring and feedback of observed output data sizes. Relatively more parallel workers may be allocated to jobs that have a higher ratio of CPU to I/O.

The executor 310 may automatically create temporary files to hold the outputs of each operation executed. Once the pipeline is completed, all of these temporary files may be automatically deleted. Alternatively, or additionally, some or all of these temporary files may be deleted as soon as they are no longer needed later in the pipeline.

In general, the pipeline library 300 may be designed to make building and running pipelines feel as similar as possible to running a regular program in the native language for which the pipeline library was designed. When the native language is Java, using local, sequential evaluation for modest-sized inputs is one way to do so. Another way is by automatically routing any output to System.out or System.err from within a user's DoFn, such as debugging prints, from the corresponding remote MapReduce worker to the main program's output streams. Likewise, any exceptions thrown within a DoFn running on a remote MapReduce worker are captured, sent to the main program, and rethrown.

The library 300 may support a cached execution mode. In this mode, rather than recompute an operation, the executor 310 first attempts to reuse the result of that operation from the previous run, if it was saved in a (internal or user-visible) file and if the executor 310 determines that the operation's result hasn't changed. An operation's result may be considered unchanged if (a) the operation's inputs haven't changed, and (b) the operation's code and captured state haven't changed. The executor 310 may perform an automatic, conservative analysis to identify when reuse of previous results is guaranteed to be safe. Caching can lead to quick edit-compile-run-debug cycles, even for pipelines that would normally take hours to run. This may reduce the amount of time required to find a bug in a late pipeline stage, fix the program, and then reexecute the revised pipeline from scratch.

Figure 4A:
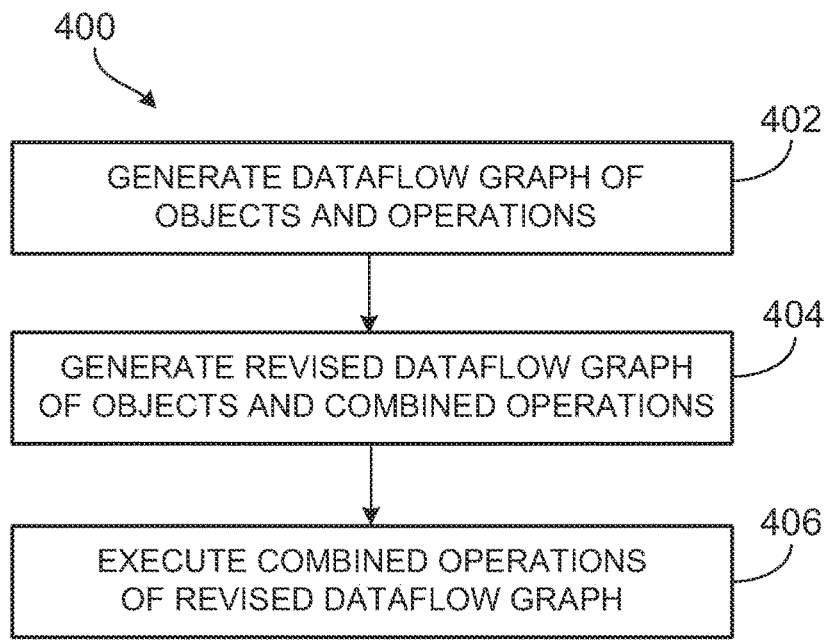
FIG. 4A is a flow chart illustrating an example of a process that may be performed by an evaluator, an optimizer, and an executor of the pipeline library.

FIG. 4A is a flow chart illustrating an example of a process 400 that may be performed by the evaluator 306, the optimizer 308, and the executor 310. Based on a data parallel pipeline that includes multiple parallel data objects and multiple parallel data operations that operate on the objects, the evaluator 306 generates a dataflow graph of deferred parallel data objects and deferred parallel operations corresponding to the data parallel pipeline (402). As described above, a deferred parallel data object is one that has not yet been computed and a deferred parallel operation is one that has not been executed. For example, as a parallel data object is encountered in the data parallel pipeline, the evaluator 306 may generate a data structure that holds a pointer to the parallel data operation that operates on the parallel data object. Similarly, as a parallel data operation is encountered, the evaluator 306 may generate a data structure that holds a pointer to a parallel data object that is an input to the deferred parallel operation and a pointer to a deferred parallel object that is an output of the deferred parallel operation.

Once the evaluator 306 has generated the dataflow graph, the optimizer 308 applies one or more graph transformations to the dataflow graph to generate a revised dataflow graph that includes the deferred parallel data objects (or a subset) and the deferred, combined parallel data operations (404). The deferred, combined parallel data operations may include one or more generalized mapreduce operations (for example, an MSCR), which includes multiple map operations and multiple reduce operations, but is translatable to a single mapreduce operation that includes a single map function to implement the map operations and a single reduce function to implement the reduce operations.

In one implementation, the optimizer 308 performs a series of passes over the dataflow graph, applying the following graph transformations or annotations in the following order: (1) sink flattens; (2) lift CombineValues operations; (3) insert fusion blocks; (4) fuse ParallelDos; and (5) fuse MSCRs.

The sink flattens transformation involves pushing a Flatten operation down through consuming ParallelDo operations by duplicating the ParallelDo before each input to the flatten. In other words, h(f(a)+g(b)) is equivalent to h(f(a))+h(g(b)). This transformation creates opportunities for ParallelDo fusion (described below).

The lift CombineValues operations annotation involves marking certain CombineValues operations for treatment as ParallelDos for ParallelDo fusion. If a CombineValues operation immediately follows a GroupByKey operation, the GroupByKey records that fact. The original CombineValues is left in place, and is henceforth treated as a normal ParallelDo operation and subject to ParallelDo fusion.

The insert fusion blocks annotation involves annotating the ParallelDos connecting two GroupByKey operations. If two GroupByKey operations are connected by a chain of one or more ParallelDo operations, the optimizer 308 chooses which ParallelDos should fuse up into the output channel of the earlier GroupByKey, and which should fuse down into the input channel of the later GroupByKey. The optimizer estimates the size of the intermediate PCollections along the chain of ParallelDos, identifies one with minimal expected size, and marks that intermediate PCollection as a boundary blocking ParallelDo fusion (that is, marks the ParallelDos on either side of that PCollection as not being subject to fusion into one another).

The fuse ParallelDos transformation involves fusing ParallelDos together. One type of ParallelDo fusion that the optimizer 306 may perform is referred to as producer-consumer fusion. If one ParallelDo operation performs function $f$, and the result is consumed by another ParallelDo operation that performs function g, the two ParallelDo operations may be replaced by a single ParallelDo that computes both $f$ and $g \circ f$. If the result of the $f$ ParallelDo is not needed by other operations in the graph, fusion has rendered it unnecessary, and the code to produce it may be removed as dead.

Another type of ParallelDo fusion is referred to as sibling fusion. ParallelDo sibling fusion may be applied when two or more ParallelDo operations read the same input PCollection. The ParallelDo operations can be fused into a single multi-output ParallelDo operation that computes the results of all the fused operations in a single pass over the input. Both producer-consumer and sibling fusion can apply to arbitrary trees of multi-output ParallelDo operations.

As mentioned earlier, CombineValues operations are special cases of ParallelDo operations that can be repeatedly applied to partially computed results. As such, ParallelDo fusion may also be applied to CombineValues operations.

The fuse MSCRs transformation involves creating MSCR operations. An MSCR operation starts from a set of related GroupByKey operations. GroupByKey operations may be considered related if the operations consume (possibly via Flatten operations) the same input or inputs created by the same ParallelDo operations. The MSCR's input and output channels are derived from the related GroupByKey operations and the adjacent operations in the execution plan. Each ParallelDo operation with at least one output consumed by one of the GroupByKey operations (possibly via Flatten operations) is fused into the MSCR, forming a new input channel. Any other inputs to the GroupByKeys also form new input channels with identity mappers. Each of the related GroupByKey operations starts an output channel. If a GroupByKey's result is consumed solely by a CombineValues operation, that operation is fused into the corresponding output channel. Similarly, if the GroupByKey's or fused CombineValues's result is consumed solely by a ParallelDo operation, that operation is also fused into the output channel, if it cannot be fused into a different MSCR's input channel. All the PCollections internal to the fused ParallelDo, GroupByKey, and CombineValues operations are now unnecessary and may be deleted. Finally, each output of a mapper ParallelDo that flows to an operation or output other than one of the related GroupByKeys generates its own pass-through output channel.

After all GroupByKey operations have been transformed into MSCR operations, any remaining ParallelDo operations are also transformed into trivial MSCR operations with a single input channel containing the ParallelDo and an identity output channel. The final optimized execution plan contains only MSCR, Flatten, and Operate operations.

Once the revised dataflow graph is generated, the executor 310 executes the deferred, combined parallel operations to produce materialized parallel data objects corresponding to the deferred parallel data objects (406). Executing the generalized mapreduce operation (for example, MSCR) can include translating the generalized mapreduce operation to the single mapreduce operation and executing the single mapreduce operation. Before executing the single mapreduce operation, the executor 310 may decide whether to execute the single mapreduce operation as a local, sequential operation or a remote, parallel operation and then execute the single mapreduce accordingly. For example, the executor 310 may decide based on the size of the input data set, as described above.

Figure 4B:
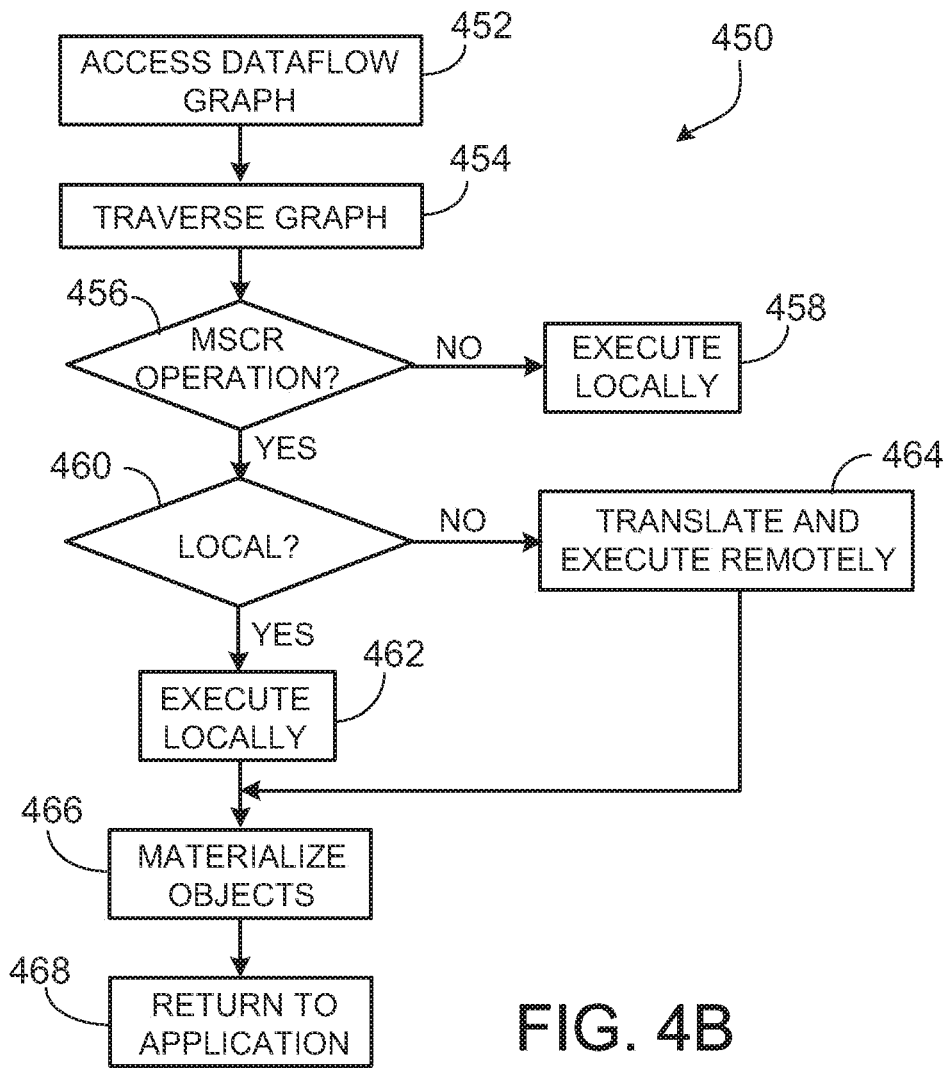
FIG. 4B is a flow chart illustrating an example of a process that may be performed by the executor of the pipeline library.

FIG. 4B is a flow chart illustrating an example of a process 450 that may be performed by the executor 310 of the pipeline library 202c to execute the revised dataflow graph. The executor 310 accesses the revised data flow graph (452) and begins traversing the data flow graph, for example, in a forward topological manner (454). As described above, in other implementations, the executor 310 may support incremental or continuous execution of pipelines.

As the executor 310 encounters non-MSCR operations (456), the executor 310 executes those operations locally using logic included in the pipeline library 202c (458). On the other hand, when the executor 310 encounters an MSCR operation (456), the executor 310 determines whether to execute the MSCR as a local, sequential operation or, instead, as a remote, parallel operation using the mapreduce library 202b (460). For example, the executor 310 may determine an estimated size of data associated with the MSCR and determine whether the estimated size exceeds a threshold size. If the estimated size is below the threshold size, executor 310 may execute the MSCR as a local, sequential operation (462). Conversely, if the estimated size is equal to or exceeds the threshold size, the executor 310 may execute the MSCR operation as remote, parallel operation by translating the MSCR into a single mapreduce operation and executing that mapreduce operation as a remote, parallel operation using the mapreduce library 202c (464).

For instance, in one implementation, the executor estimates the size of the input data for each input channel of the MSCR, estimates the size of the intermediary data produced by each input channel, and estimates the size of the output data from each output channel. If any of these size estimates is equal to or exceeds 64 megabytes (MB), then the MSCR is executed as a remote, parallel operation using the mapreduce library 202b (464).

When executing the MSCR as a local, sequential operation, the executor 310 may perform the appropriate operations over the data is a sequential fashion. For example, the executor may implement in-memory for-loops to access the data and perform the appropriate operations on the data.

When executing the MSCR as a remote, parallel operation using the mapreduce library 202b, the executor 310 may estimate the number of map worker processes and reduce worker processes needed to perform the associated processing based on the configuration of the input and output channels of the MSCR. For instance, the executor may estimate the number of map worker processes for each input channel based, for example, on an estimated or known size of the input data for each input channel and, similarly, may estimate the number of reduce worker processes based, for example, on an estimated or known amount of data to be processed by each output channel. The executor 310 may then add up the number of map worker processes and reduce worker processes and cause these worker processes to be invoked using the mapreduce library 202b.

Each map worker and each reduce worker is given an index number. For example, if the MSCR includes two input channels, one with 4 map worker processes and the other with 5 map worker processes, then the 9 workers may be given an index number from 1 to 9. The same may occur for the reduce worker processes. These index numbers are used to associate a given map worker process or reduce worker process with a particular input or output channel, respectively. Continuing the foregoing example, index numbers 1-4 may be associated with the first input channel, while index numbers 5-9 may be associated with the second input channel.

The executor 310 also translates the MSCR into a single mapreduce operation by generating a single map function that implements the multiple map operations in the input channels of the MSCR and a single reduce function that implements the multiple reduce operations in the output channels of the MSCR. The map function uses the index of the map worker processes as the basis for selecting which map operation is applied to the input. For example, an if-then statement may be included as part of the map function, with the index numbers of the map workers being the decision points for the if-then statement.

Thus, as the mapreduce library 202b assigns a map task to a map worker process, the worker's associated index is passed into the map function, along with an identity of the file to be worked on. The index number then dictates which map operation (parallelDo) the map function invokes on the elements in the file and, thereby, which input channel the worker implements.

Similarly, the reduce function uses the index of the reduce worker processes as the basis for selecting which reduce operation is applied to the input of the reduce worker process. As a reduce worker function is assigned a reduce task, the worker's associated index is passed into the reduce function, along with an identity of the file to be worked on (which contains a single flattened stream of key-grouped inputs). The index number then dictates which reduce operation the reduce function invokes on the elements in the file and, thereby, which output channel the worker implements. If the reduce worker process implements a grouping output channel, the reduce worker process performs the CombineValues "combine" operation (if any), and then the ParallelDo "reduce" operation. If the reduce worker process implements a pass-through output channel, the reduce worker process performs an ungrouping operation that outputs key/value pairs, undoing the effect of the mapreduce library's implicit shuffle.

Each of the MSCR operation's input channels can emit key/value pairs to any of its R output channels. For example, input channel 2 sends one output to output channel 1 and another output to output channel 3, and nothing to output channel 2.

The mapreduce library 202b handles the shuffle on the data output by the map worker processes and then routes the output to the correct reducer worker. Each of the MSCR operation's input channels can emit key/value pairs to any of its R output channels. For example, input channel 2 sends one output to output channel 1 and another output to output channel 3, and nothing to output channel 2. This is handled, for example, by the pipeline library 202c by using an emitToShard(key, value, shardNum) primitive in the mapreduce library 202b, which allows the pipeline library 202c to designate which reduce worker process a given output of a map worker process is sent to. When sending an output from a given map worker process to a particular output channel, the pipeline library 202c may compute the range of reduce worker indices corresponding to that output channel, chooses one of them using a deterministic function, and uses the emitToShard function to send the output to the chosen reducer worker. The deterministic function may include a hash on the key associated with the output values, with the result of the hash determining which of the reduce worker processes within the range of indices for the output is chosen. This may ensure that all of the data associated with a particular key is sent to the same reduce worker process.

In one implementation, the mapreduce library 202b only directly supports writing to a single output. Moreover, in one implementation of the mapreduce library 202b, if the reduce function's output expects key/value pairs, the keys written to this output must be the same as the keys passed in to the reduce function. In contrast, in an implementation, each MSCR output channel can write to zero, one, or several outputs, with no constraints on keys. To implement these more-flexible outputs, the reduce function may write directly to the outputs, bypassing the mapreduce library's normal output mechanism. If any of the MSCR's outputs satisfies the restrictions of a mapreduce library's output, then that output can instead be implemented using the mapreduce library's normal mechanisms.

As each of the parallel operations is evaluated, the executor 310 populates the deferred objects with the appropriate data to materialize the objects (466) until all operations are completed, at which time the executor 310 returns control back over to the application 202a (468).

Figure 5A:
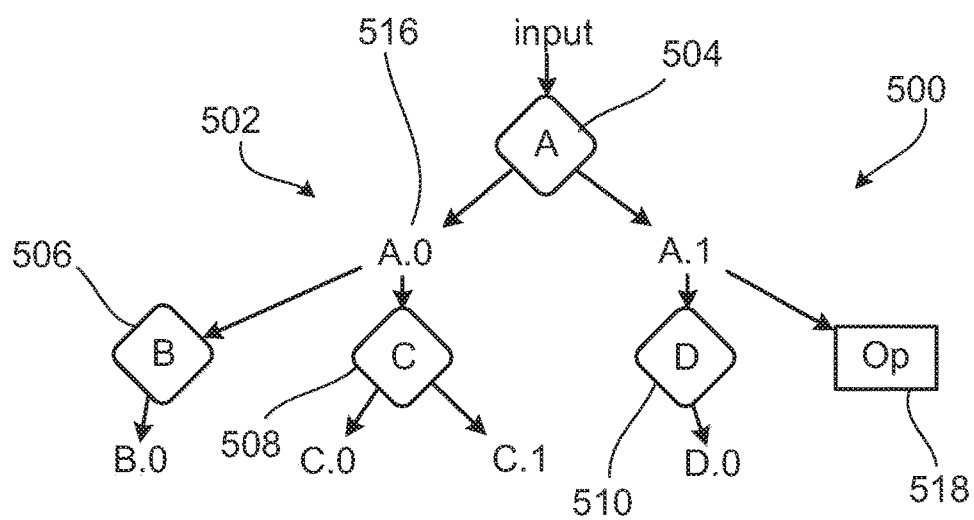
FIGS. 5A and 5B show an example dataflow graph transformation that illustrates ParallelDo producer-consumer fusion and sibling fusion.
Figure 5B:
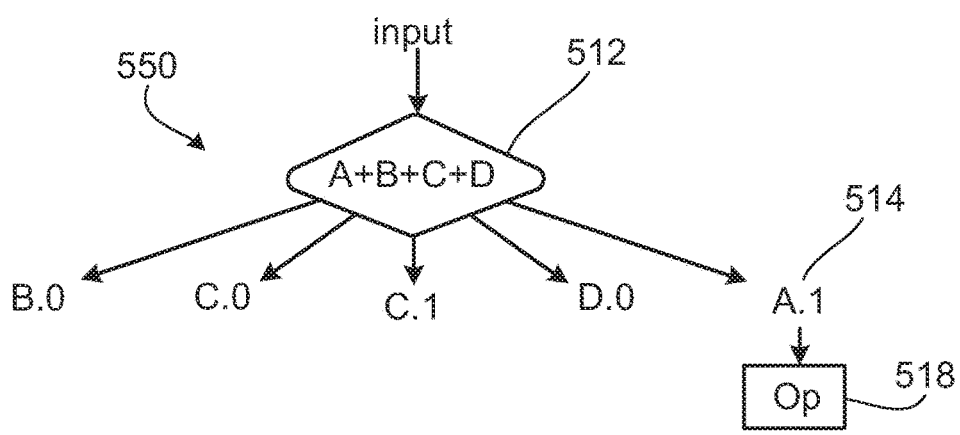

FIG. 5 shows an example execution plan transformation that illustrates ParallelDo producer-consumer fusion and sibling fusion. Graph 502 illustrates the original graph that includes ParallelDo operations A 504, B 506, C 508, and D 510. As shown, ParallelDo operations A 504, B 506, C 508, and D 510 are fused into a single ParallelDo A+B+C+D 512 to form graph 550. The new ParallelDo in graph 550 creates all the leaf outputs from the original graph 502, plus output A.1 514, since output A.1 514 is needed by some other operation Op 518. Intermediate output A.0 516 is no longer needed and is fused away in graph 550.

Figure 6A:
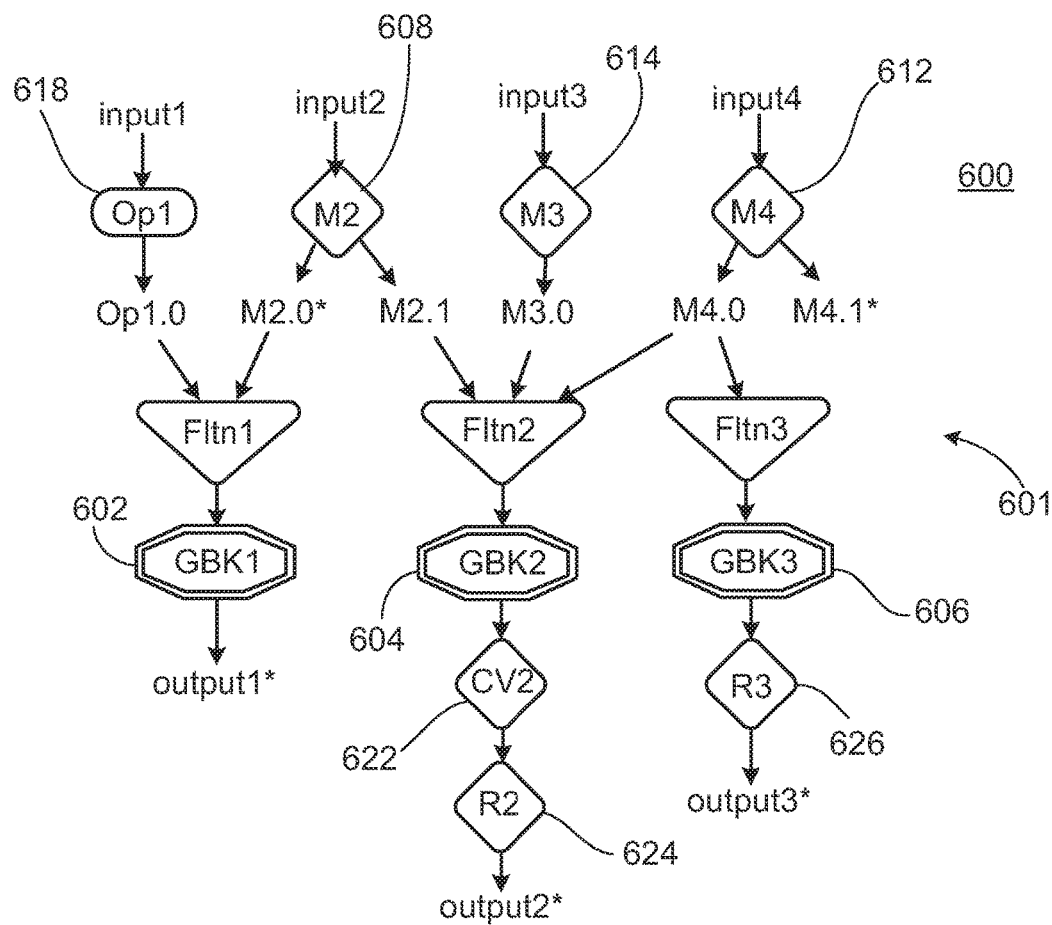
FIGS. 6A and 6B show an example dataflow graph transformation that illustrates MSCR fusion.
Figure 6B:
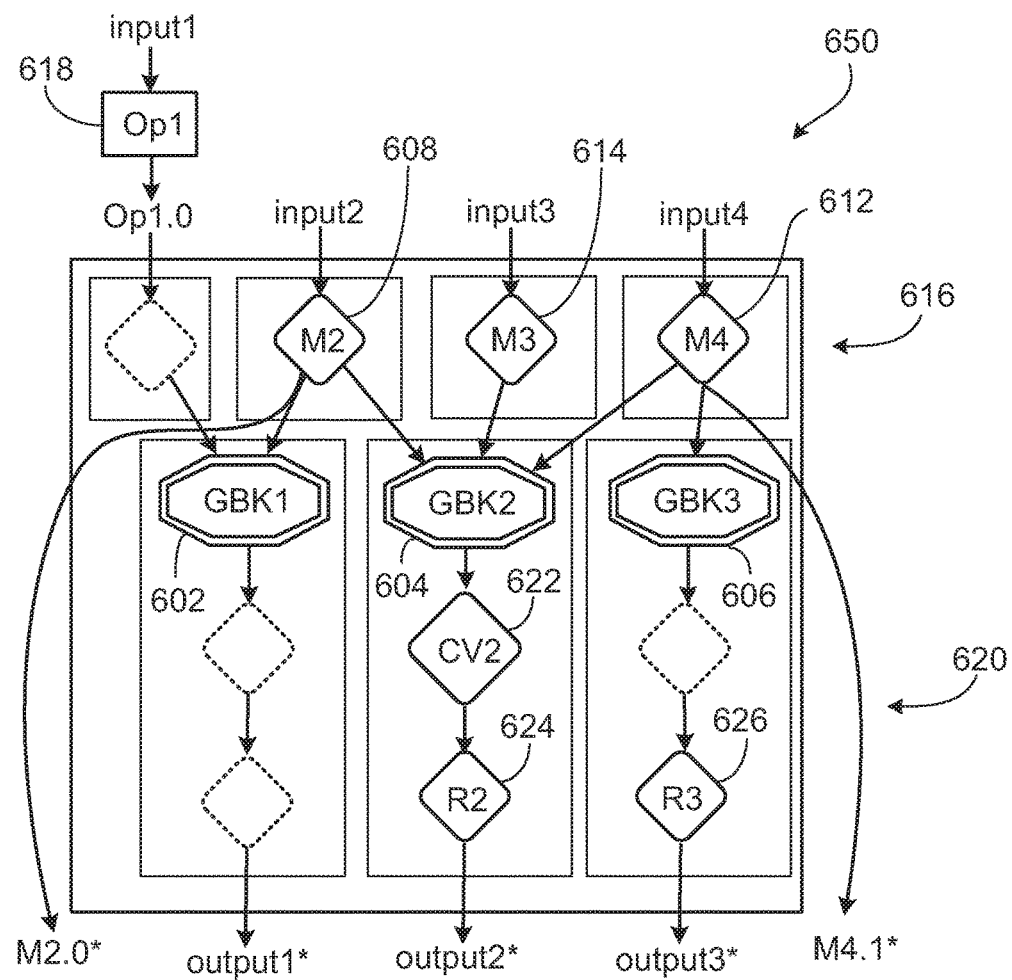

FIGS. 6A and 6B show an example execution plan transformation 600 that illustrates MSCR fusion. Graph 601 illustrates the original graph that includes three GroupByKey operations, GBK1 602, GBK2 604, and GBK3 606. In this example, all three GroupByKey operations 602, 604, 606 are related, and hence seed a single MSCR operation 652 as shown in revised graph 650. Referring to graph 601, GBK1 602 is related to GBK2 604 because they both consume outputs of ParallelDo M2 608. GBK2 604 is related to GBK3 606 because they both consume PCollection M4.0 612. The PCollection M2.0 is needed by later operations other than GBK1 602, as designated by the star. Similarly, the PCollection M4.1 is needed by later operations other than those operations forming the MSCR operation.

Referring to graph 650, the ParallelDos M2 608, M3 614, and M4 612 are incorporated as MSCR input channels 616. Each of the GroupByKey 602, 604, 606 operations becomes a grouping output channel 620. GBK2's output channel incorporates the CV2 CombineValues operation 622 and the R2 ParallelDo operation 624. The R3 ParallelDo 626 operation is also fused into an output channel. An additional identity input channel is created for the input to GBK1 from non-ParallelDo Op1. Two additional pass-through output channels (shown as edges from mappers to outputs) are created for the M2.0 and M4.1 PCollections that are used after the MSCR operation. The resulting MSCR operation 650a has 4 input channels 616 and 5 output channels 620.

FIGS. 7A-7E illustrate an example of a dataflow graph transformation performed, for example, by optimizer 306.

Figure 7A:
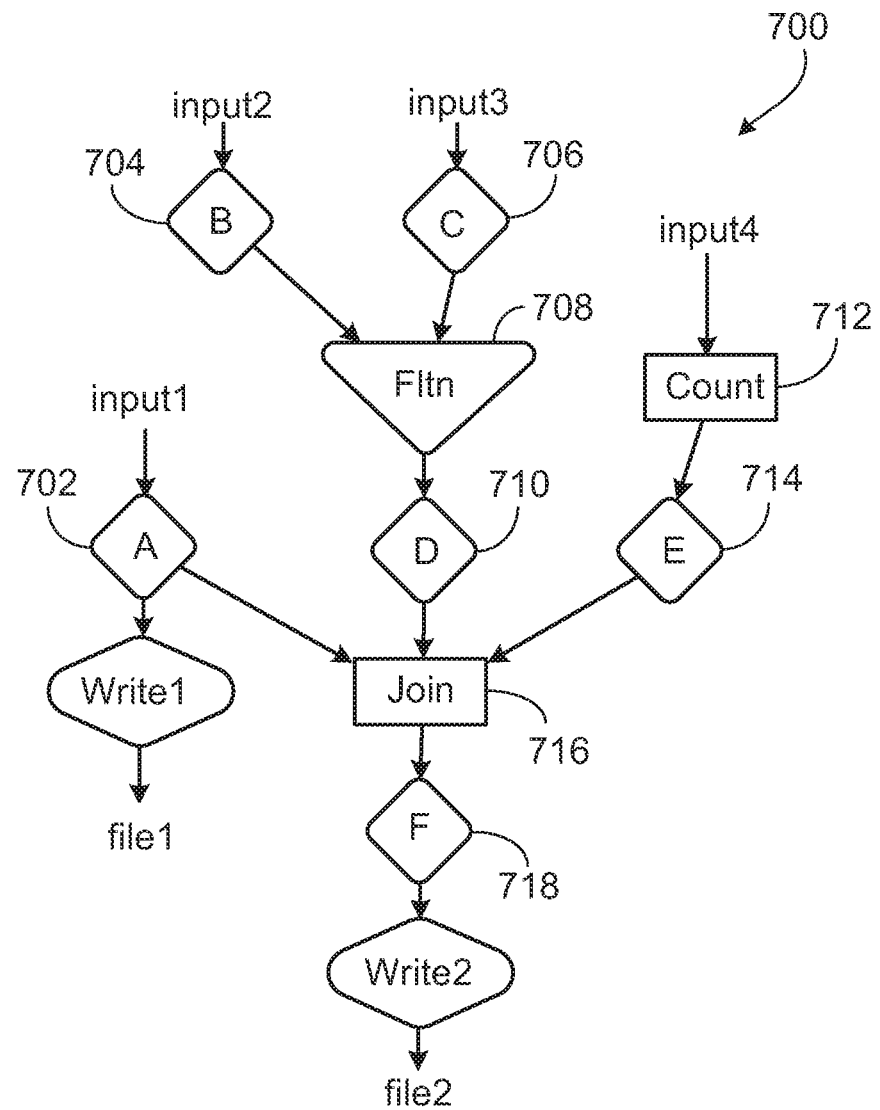
FIGS. 7A-7E illustrate an example of a dataflow graph transformation performed to generate a final dataflow graph.

FIG. 7A illustrates the initial parallel data pipeline 700. For simplicity, the parallel data objects are not shown. This pipeline takes four different input sources and writes two outputs. Input1 is processed by parallelDo( ) A 702. Input2 is processed by parallelDo( ) B 704, and Input3 is processed by parallelDo( ) C 706. The results of these two operations are flatten( )ed 708 together and fed into parallelDo( ) D 710. Input4 is counted using the count( ) derived operation 712, and the result is further processed by parallelDo( ) E 714. The results of parallelDo( ) A, D, and E 702, 710, 714 are joined together using the join( ) 716 derived operation. The result of the join( ) 716 is processed further by parallelDo( ) F 718. Finally, the results of parallelDo( ) A and F 702 and 718 are written out to external files.

Figure 7B:
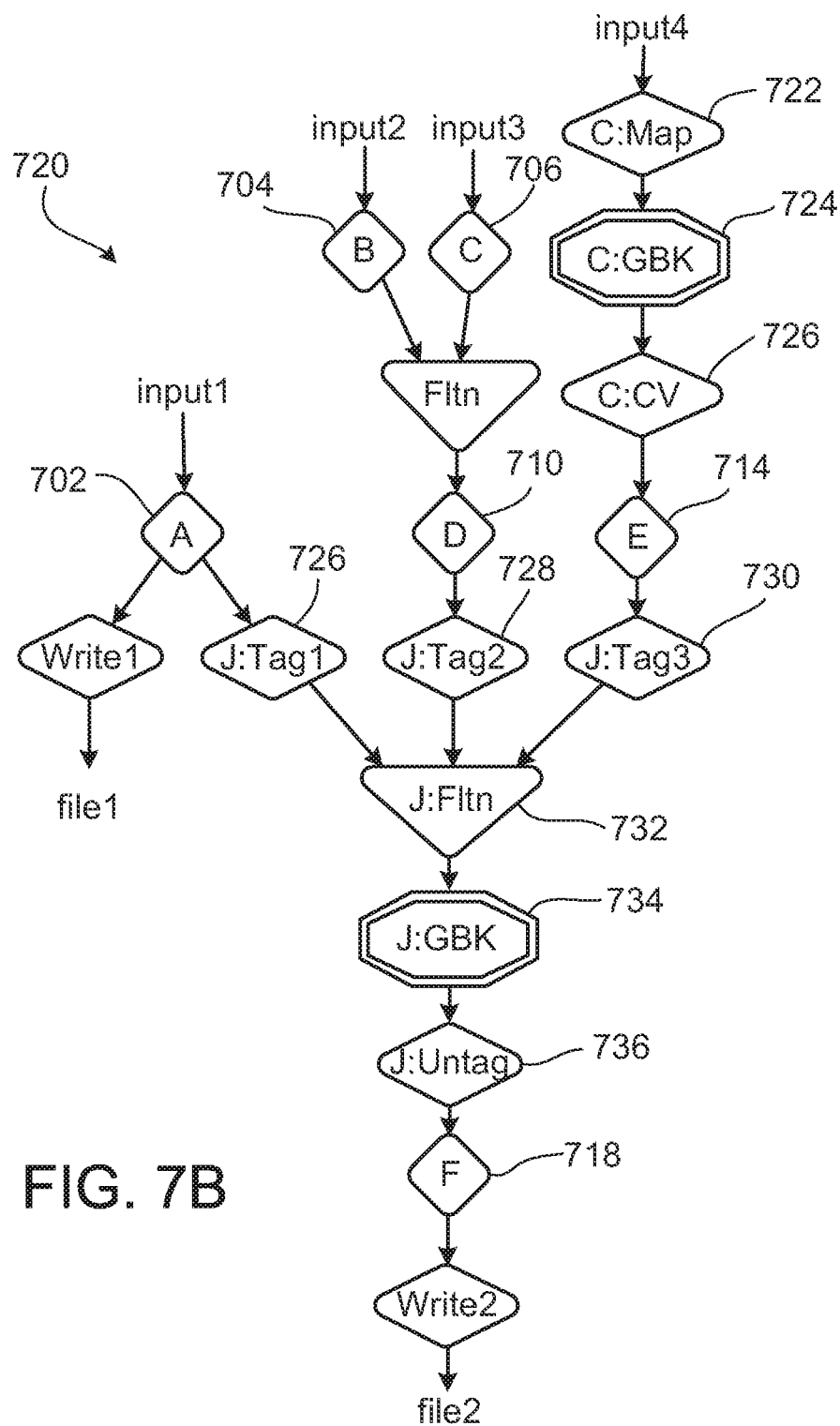

FIG. 7B illustrates the initial dataflow graph 720, which is constructed from calls to primitives like parallelDo( ) and flatten( ), and derived operations like count( ) and join( ), which are themselves implemented by calls to lower-level operations. In this example, the count( ) call expands into ParallelDo C:Map 722, GroupByKey C:GBK 724, and CombineValues C:CV 726, and the join( ) call expands into ParallelDo operations J:Tag1 726, J:Tag2 728, and J:Tag3 730 to tag each of the N input collections, Flatten J:Fltn 732, GroupByKey J:GBK 734, and ParallelDo J:Untag 736 to process the results.

Figure 7C:
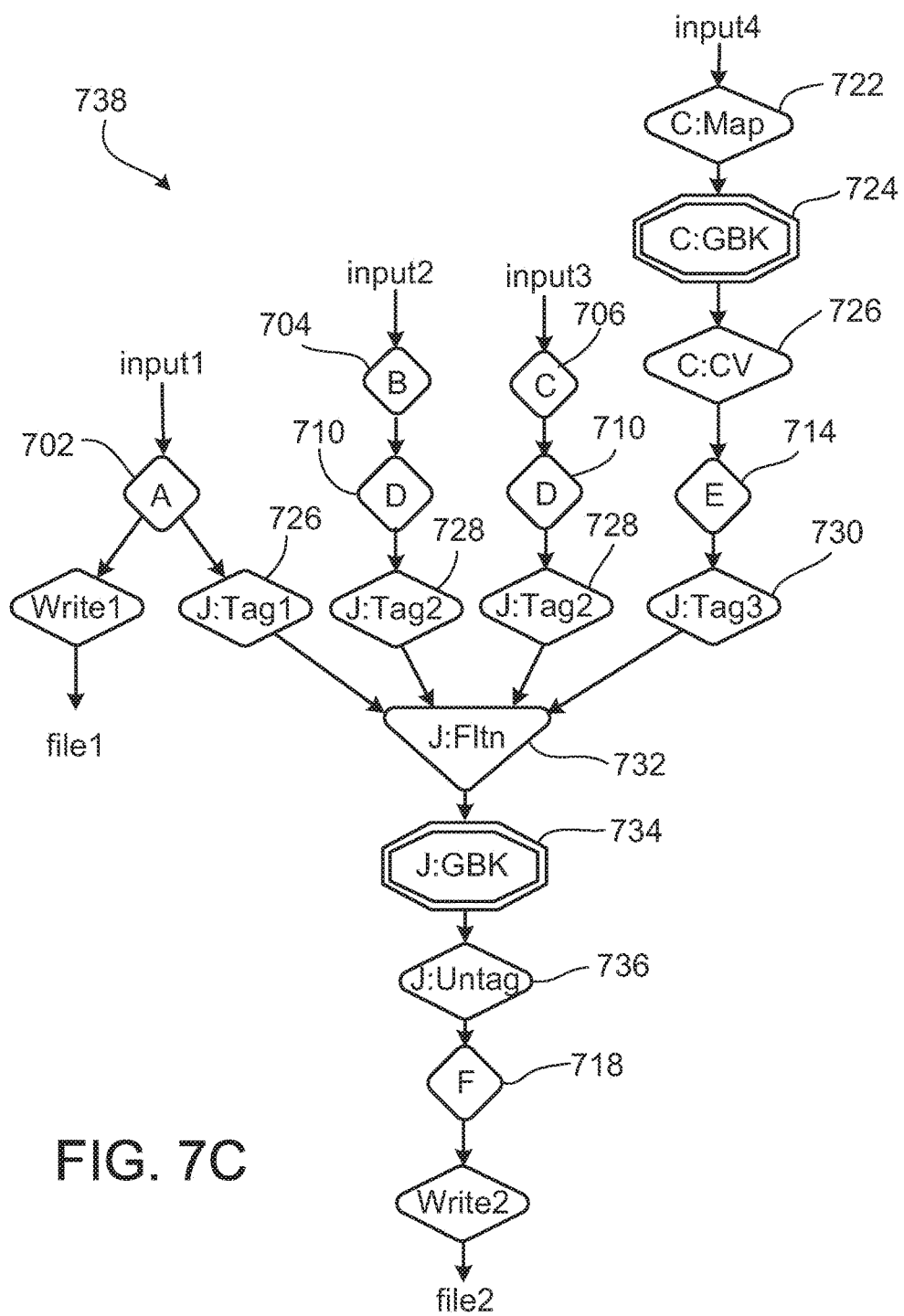

FIG. 7C shows a revised dataflow graph 738 that results from a sink flattens transformation being applied to graph 720. The Flatten operation Fltn 708 is pushed down through consuming ParallelDo operations D 710 and JTag:2 728.

Figure 7D:
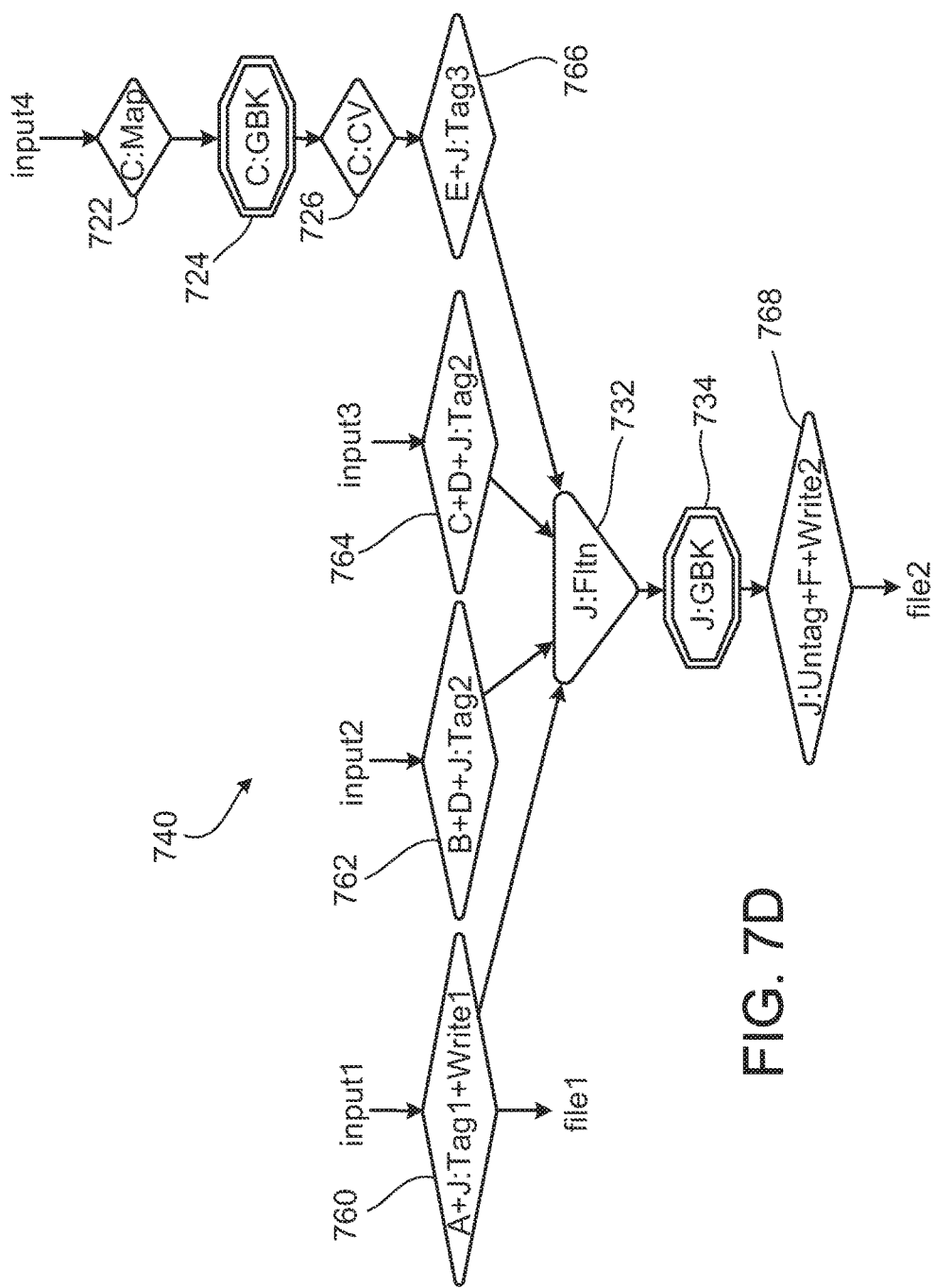

FIG. 7D shows a revised dataflow graph 740 that results from a ParallelDo fusion transformation being applied to graph 738. Both producer-consumer and sibling fusion are applied to adjacent ParallelDo operations to produce ParallelDo operations 760, 762, 764, 766, and 768.

Figure 7E:
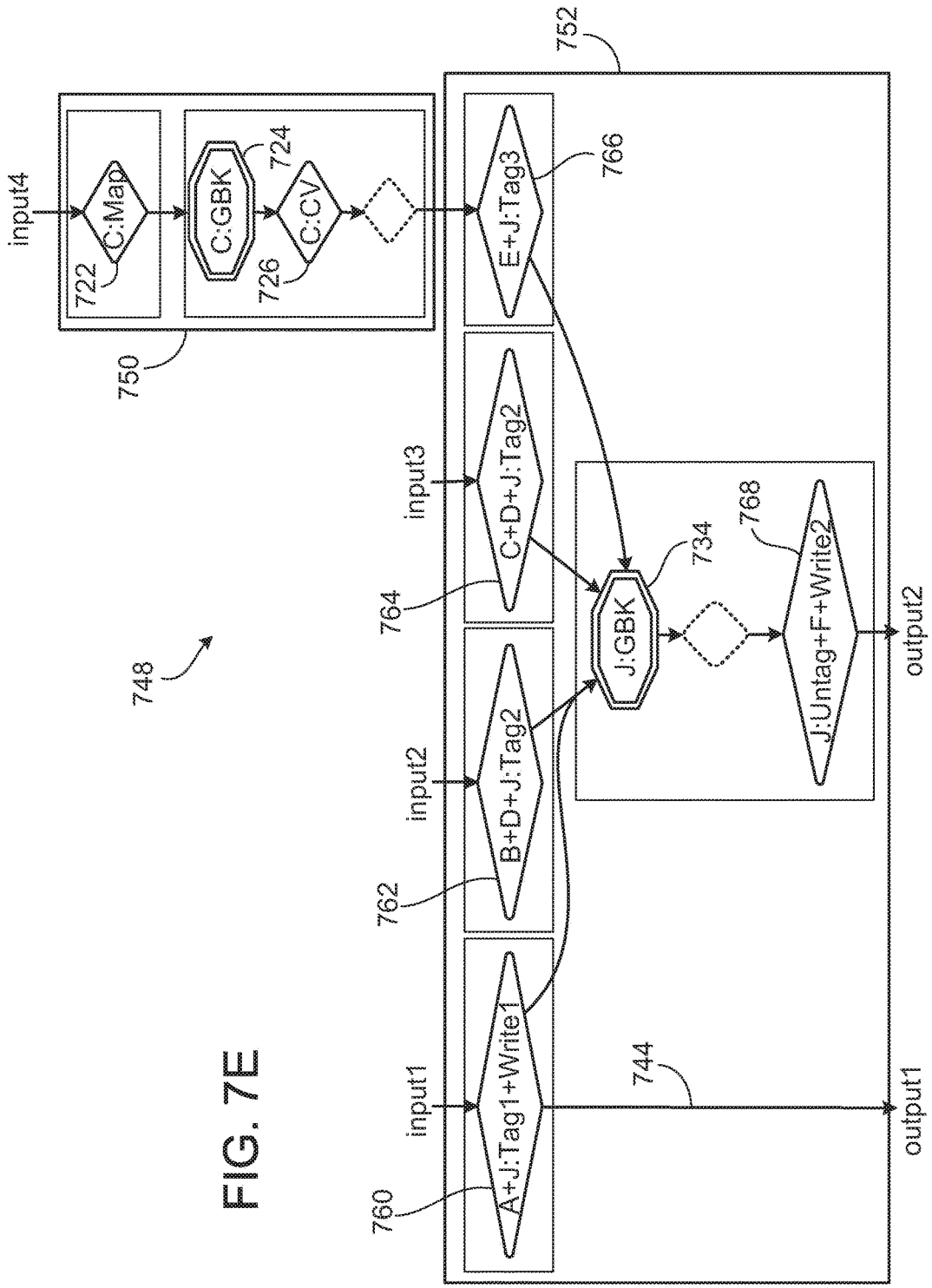

FIG. 7E shows the final, revised dataflow graph 748 that results from a MSCR fusion transformation being applied to graph 740. GroupByKey operation C:GBK 724 and surrounding ParallelDo operations (C:Map 722 and C:CV 726) are fused into a first MSCR operation 750. GroupByKey operations J:GBK 734 becomes the core operation of a second MSCR operation 752 and is included in a grouping output channel. The second MSCR operation 752 also includes the remaining ParallelDo operations 770, 762, 764, and 766 in a respective input channel, and a pass through output channel 744. The original execution plan had 16 data-parallel operations (ParallelDos, GroupByKeys, and CombineValues). The final plan has two MSCR operations.

While described as implemented as a library, the functionality of the pipeline library 202c may, additionally or alternatively, be implemented as a service that allows a client system to access the functionality over a network, such as the Internet. For instance, the functionality of the pipeline library 202c can be implemented on a server system as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. Alternatively, or additionally, an interface, such as a web page, may be provided to access the service over the network.

Using the API or interface, a user may send a program developed by the user to the service from a client system. The program, for example, may include a data parallel pipeline implemented using the parallel collection classes 302 and parallel operations 304. Using the API or interface, the user may designate data for the pipeline and send a message to the service to execute the program, possibly with any arguments needed for the program. Once the message is received, the service executes the program and implements the functionality of the evaluator 306, the optimizer 308, and the executor 310 to implement that data parallel pipeline. The service then may return any outputs of the program to the client system. Alternatively, or additionally, the user program may execute on the client system, with the program using the API to implement the data parallel pipeline using the functionality of the evaluator 306, the optimizer 308, and the executor 310 implemented by the service.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be. Accordingly, other implementations are within the scope of the following claims.

What is claimed is:

1. A computer-implemented method, comprising:
executing a deferred, combined parallel operation, which is included in a dataflow graph that comprises deferred parallel data objects and deferred, combined parallel operations corresponding to a data parallel pipeline, to produce materialized parallel data objects corresponding to deferred parallel data objects, wherein the executing comprises:
determining an estimated size of data associated with the deferred, combined parallel operation being executed;
determining that the estimated size of data associated with the deferred, combined parallel operation exceeds a threshold size based at least on accessing annotations in the dataflow graph that represent an estimate of the size of the data associated with the deferred, combined parallel operation; and
in response to determining that the estimated size exceeds the threshold size, executing the deferred, combined parallel operation as a remote, parallel operation.

2. The method of claim 1, wherein the deferred, combined parallel operation is a first deferred, combined parallel operation and the dataflow graph includes a second deferred, combined parallel operation, the method further comprising:
executing the second deferred, combined parallel operation to produce materialized data objects corresponding to the second deferred, combined parallel operation, wherein the executing comprises:
determining an estimated size of data associated with the second deferred, combined parallel operation;
determining that the estimated size associated with the deferred, combined parallel operation is less than the threshold size; and
in response to determining that the estimated size is less than the threshold size, executing the second deferred, combined parallel operation as a local, sequential operation.

3. The method of claim 1, wherein the materialized data objects are configured to be accessed during execution of a program corresponding to sequential programming language instructions associated with the data parallel pipeline.

4. The method of claim 3, comprising determining the dataflow graph for the data parallel pipeline by analyzing the sequential programming language instructions associated with the data parallel pipeline.

5. The method of claim 1, wherein the materialized data objects comprise one or more of: input data for the deferred, combined parallel operation, intermediary data produced by the deferred, combined parallel operation, or output data produced by the deferred, combined parallel operation.

6. The method of claim 1, wherein:
the deferred, combined parallel operation is a generalized mapreduce operation comprising multiple, parallel map operations and multiple, parallel reduce operations and is translatable to a single mapreduce operation that comprises a single map function to implement the multiple, parallel map operations and a single reduce function to implement the multiple, parallel reduce operations; and
executing the deferred, combined parallel operation comprises translating the generalized mapreduce operation to the single mapreduce operation and executing the single mapreduce operation.

7. A system comprising:
one or more computers; and
memory storing instructions that, upon being executed by the one or more computers, cause the one or more computers to perform operations comprising:
executing a deferred, combined parallel operation, which is included in a dataflow graph that comprises deferred parallel data objects and deferred, combined parallel operations corresponding to a data parallel pipeline, to produce materialized parallel data objects corresponding to deferred parallel data objects, wherein the executing comprises:
  determining an estimated size of data associated with the deferred, combined parallel operation being executed;
  determining that the estimated size of data associated with the deferred, combined parallel operation exceeds a threshold size based at least on accessing annotations in the dataflow graph that represent an estimate of the size of the data associated with the deferred, combined parallel operation; and
  in response to determining that the estimated size exceeds the threshold size, executing the deferred, combined parallel operation as a remote, parallel operation.

8. The system of claim 7, wherein the deferred, combined parallel operation is a first deferred, combined parallel operation and the dataflow graph includes a second deferred, combined parallel operation, the operations further comprising:
  executing the second deferred, combined parallel operation to produce materialized data objects corresponding to the second deferred, combined parallel operation, wherein the executing comprises:
    determining an estimated size of data associated with the second deferred, combined parallel operation;
    determining that the estimated size associated with the deferred, combined parallel operation is less than the threshold size; and
    in response to determining that the estimated size is less than the threshold size, executing the second deferred, combined parallel operation as a local, sequential operation.

9. The system of claim 7, wherein the materialized data objects are configured to be accessed during execution of a program corresponding to sequential programming language instructions associated with the data parallel pipeline.

10. The system of claim 9, the operations comprising determining the dataflow graph for the data parallel pipeline by analyzing the sequential programming language instructions associated with the data parallel pipeline.

11. The system of claim 7, wherein the materialized data objects comprise one or more of: input data for the deferred, combined parallel operation, intermediary data produced by the deferred, combined parallel operation, or output data produced by the deferred, combined parallel operation.

12. The system of claim 7, wherein:
  the deferred, combined parallel operation is a generalized mapreduce operation comprising multiple, parallel map operations and multiple, parallel reduce operations and is translatable to a single mapreduce operation that comprises a single map function to implement the multiple, parallel map operations and a single reduce function to implement the multiple, parallel reduce operations; and
  executing the deferred, combined parallel operation comprises translating the generalized mapreduce operation to the single mapreduce operation and executing the single mapreduce operation.

13. A computer-readable storage device storing instructions that, upon execution by one or more processors, cause the one or more processors to perform operations comprising:
executing a deferred, combined parallel operation, which is included in a dataflow graph that comprises deferred parallel data objects and deferred, combined parallel operations corresponding to a data parallel pipeline, to produce materialized parallel data objects corresponding to deferred parallel data objects, wherein the executing comprises:
  determining an estimated size of data associated with the deferred, combined parallel operation being executed;
  determining that the estimated size of data associated with the deferred, combined parallel operation exceeds a threshold size based at least on accessing annotations in the dataflow graph that represent an estimate of the size of the data associated with the deferred, combined parallel operation; and
  in response to determining that the estimated size exceeds the threshold size, executing the deferred, combined parallel operation as a remote, parallel operation.

14. The computer-readable storage device of claim 13, wherein the deferred, combined parallel operation is a first deferred, combined parallel operation and the dataflow graph includes a second deferred, combined parallel operation, the operations further comprising:
  executing the second deferred, combined parallel operation to produce materialized data objects corresponding to the second deferred, combined parallel operation, wherein the executing comprises:
    determining an estimated size of data associated with the second deferred, combined parallel operation;
    determining that the estimated size associated with the deferred, combined parallel operation is less than the threshold size; and
    in response to determining that the estimated size is less than the threshold size, executing the second deferred, combined parallel operation as a local, sequential operation.

15. The computer-readable storage device of claim 13, wherein the materialized data objects are configured to be accessed during execution of a program corresponding to sequential programming language instructions associated with the data parallel pipeline.

16. The computer-readable storage device of claim 13, wherein the materialized data objects comprise one or more of: input data for the deferred, combined parallel operation, intermediary data produced by the deferred, combined parallel operation, or output data produced by the deferred, combined parallel operation.

17. The computer-readable storage device of claim 13, wherein
  the deferred, combined parallel operation is a generalized mapreduce operation comprising multiple, parallel map operations and multiple, parallel reduce operations and is translatable to a single mapreduce operation that comprises a single map function to implement the multiple, parallel map operations and a single reduce function to implement the multiple, parallel reduce operations; and
  executing the deferred, combined parallel operation comprises translating the generalized mapreduce operation to the single mapreduce operation and executing the single mapreduce operation.

* * * * *